US012772200B2

(12) United States Patent
Lee et al.

(10) Patent No.: US 12,772,200 B2
(45) Date of Patent: Oct. 20, 2026

(54) METHOD AND DEVICE FOR ESTIMATING LOCATION OF TERMINAL IN WIRELESS COMMUNICATION SYSTEM

(71) Applicant: Samsung Electronics Co., Ltd., Suwon-si (KR)

(72) Inventors: Taeseop Lee, Suwon-si (KR); Seungri Jin, Suwon-si (KR); June Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 18/780,972

(22) Filed: Jul. 23, 2024

(65) Prior Publication Data

US 2025/0048317 A1 Feb. 6, 2025

(30) Foreign Application Priority Data

Jul. 31, 2023 (KR) ........................ 10-2023-0099839

(51) Int. Cl.

| | |
|---|---|
| ***H04W 64/00*** | (2009.01) |
| ***H04L 5/00*** | (2006.01) |
| ***H04W 8/22*** | (2009.01) |
| ***H04W 24/10*** | (2009.01) |

(52) U.S. Cl.

CPC ........... *H04W 64/00* (2013.01); *H04L 5/0051* (2013.01); *H04W 8/22* (2013.01); *H04W 24/10* (2013.01)

(58) Field of Classification Search

CPC ......... H04W 64/00; H04W 8/22; H04W 8/24; H04W 24/08; H04W 24/10; H04W 4/029; H04L 5/0051; H04L 5/0098

See application file for complete search history.

(56) References Cited

U.S. PATENT DOCUMENTS

2022/0077981 A1* 3/2022 Duan .................... G01S 13/876
2023/0231687 A1 7/2023 Huang et al.
2024/0057012 A1* 2/2024 Oteri ..................... G01S 5/0236

FOREIGN PATENT DOCUMENTS

KR 10-2025-0001741 A 1/2025
WO WO-2022150211 A1 * 7/2022 ........... G01S 5/0236
WO WO-2024035463 A1 * 2/2024 ............ H04W 24/08

OTHER PUBLICATIONS

Moderator (Zte), Summary #3 for PRS and SRS BW aggregation, R1-2304083, 3GPP TSG RAN WG1 #112bis-e, Apr. 27, 2023.
LG Electronics, Discussions on DL Reference Signals for NR Positioning, R1-1912272, 3GPP TSG RAN WG1 #99, Nov. 9, 2019.

(Continued)

*Primary Examiner* — Siu M Lee
(74) *Attorney, Agent, or Firm* — Jefferson IP Law, LLP

(57) ABSTRACT

The disclosure relates to a 5G or 6G communication system for supporting a higher data transmission rate. A method performed by a user equipment (UE) in a wireless communication system is provided. The method includes receiving, from a location management function (LMF) entity, a request capabilities message, and transmitting, to the LMF entity, a provide capabilities message including capability information per band, wherein the capability information includes information on maximum aggregated downlink positioning reference signal (DL-PRS) bandwidth (BW) and information on maximum number of aggregated DL-PRS resources in a slot.

20 Claims, 11 Drawing Sheets

(56) References Cited

OTHER PUBLICATIONS

Apple Inc., On Bandwidth aggregation for positioning measurements, R1-2305252, 3GPP TSG RAN WG1 #113, May 15, 2023.
Lenovo, PRS/SRS Bandwidth Aggregation Discussion, R1-2305743, 3GPP TSG RAN WG1#113, May 15, 2023.
International Search Report dated Oct. 30, 2024, issued in International Application No. PCT/KR2024/010607.

* cited by examiner

METHOD AND DEVICE FOR ESTIMATING LOCATION OF TERMINAL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2023-0099839, filed on Jul. 31, 2023, in the Korean Intellectual Property Office, the disclosure of which is incorporated by reference herein in its entirety.

BACKGROUND

1. Field

The disclosure relates to a communication method and device of a wireless communication system. More particularly, the disclosure relates to a method and a device for using an aggregated downlink positioning reference signal (DL-PRS) to estimate the location of a terminal.

2. Description of Related Art

Fifth generation (5G) mobile communication technologies define broad frequency bands such that high transmission rates and new services are possible, and can be implemented not only in "Sub 6 giga hertz (GHz)" bands such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, Layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical (PHY) layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR User Equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step Random Access Channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

A user equipment (UE) may perform dual connectivity. In dual connectivity, a base station (BS) providing micro cell coverage may become a maser node (MN) and may process both a control plane and a user plane, and another BS having small cell coverage may be called a secondary node (SN) and may serve as an assistant for processing only the user plane. That is, the MN may process control signaling, and the SN may be used to improve a data transmission rate. The MN may provide conditional primary secondary cell (PS- Cell) change (CPC) configuration information to the UE, and the UE may evaluate the condition and, when the condition is satisfied, make a request for a change to the SN satisfying the condition. Further, the user equipment (UE) may store the CPC configuration information for several SNs provided by the MN and continuously make the SN change request whenever the condition is satisfied after the evaluation. With the advance of mobile communication systems as described above, various services can be provided, and accordingly there is a need for ways to effectively provide these services, in particular, ways to provide efficient discontinuous reception (DRX) configuration methods.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and a method by which a service for estimating the location of a terminal is effectively providable in a wireless communication system.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes receiving, from a location management function (LMF) entity, a request capabilities message, and transmitting to the LMF entity, a provide capabilities message including capability information per band, wherein the capability information includes information on maximum aggregated downlink positioning reference signal (DL-PRS) bandwidth (BW) and information on maximum number of aggregated DL-PRS resources in a slot.

In accordance with another aspect of the disclosure, a method performed by a location management function (LMF) entity in a wireless communication system is provided. The method includes transmitting, to a user equipment (UE), a request capabilities message, and receiving from the UE, a provide capabilities message including capability information per band, wherein the capability information includes information on maximum aggregated downlink positioning reference signal (DL-PRS) bandwidth (BW) and information on maximum number of aggregated DL-PRS resources in a slot.

In accordance with another aspect of the disclosure, a user equipment (UE) in a wireless communication system is provided. The UE includes a transceiver, and a controller coupled with the transceiver and configured to receive, from a location management function (LMF) entity, a request capabilities message, and transmit, to the LMF entity, a provide capabilities message including capability information per band, wherein the capability information includes information on maximum aggregated downlink-positioning reference signal (DL-PRS) bandwidth (BW) and information on maximum number of aggregated DL-PRS resources in a slot.

In accordance with another aspect of the disclosure, a location management function (LMF) entity in a wireless communication system is provided. The LMF entity includes a transceiver, and a controller coupled with the transceiver and configured to transmit, to a user equipment (UE), a request capabilities message, and receive, from the UE, a provide capabilities message including capability information per band, wherein the capability information includes information on maximum aggregated downlink positioning reference signal (DL-PRS) bandwidth (BW) and information on maximum number of aggregated DL-PRS resources in a slot.

In accordance with another aspect of the disclosure, one or more non-transitory computer-readable storage media storing one or more computer programs including computer-executable instructions that, when executed by one or more processors of a user equipment (UE) individually or collectively, cause the UE to perform operations are provided. The operations include receiving, from a location management function (LMF) entity, a request capabilities message, and transmitting, to the LMF entity, a provide capabilities message including capability information per band, wherein the capability information includes information on maximum aggregated downlink positioning reference signal (DL-PRS) bandwidth (BW) and information on maximum number of aggregated DL-PRS resources in a slot.

The disclosure provides a device and a method by which a service is effectively providable in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 illustrates pieces of DL-PRS configuration information 130 included in an LPP Provide Assistance Data message according to an embodiment of the disclosure;

The same reference numerals are used to represent the same elements throughout the drawings.

DETAILED DESCRIPTION

Figure 1A:
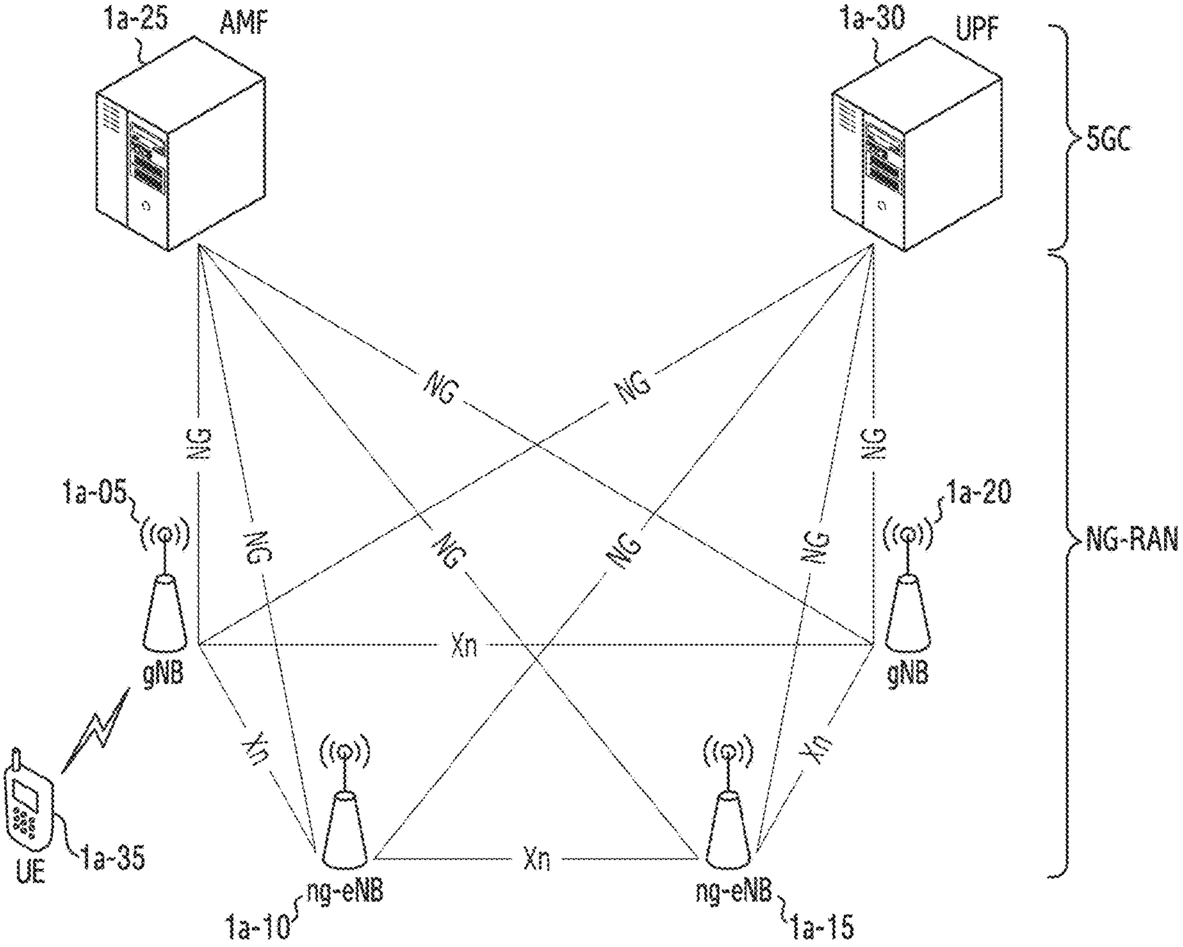
FIG. 1A is a diagram illustrating a structure of an NR system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure and ways to achieve them will be apparent by making reference to embodiments as described below in detail in conjunction with the accompanying drawings. The disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference signs indicate the same or like elements.

It will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block in the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. The "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". The elements and "units" may be implemented to reproduce one or more central processing units (CPUs) within a device or a security multimedia card. Furthermore, the "unit" in the embodiments may include one or more processors.

In the following disclosure, detailed descriptions of known functions or configurations incorporated herein will be omitted when it is determined that the description may make the subject matter of the disclosure unnecessarily unclear. Embodiments of the disclosure will be described with reference to the accompanying drawings.

Terms for identifying access nodes, terms referring to network entities, terms referring to messages, terms referring to interfaces between network entities, terms referring to various identification information, and the like are illustratively used for the sake of descriptive convenience. The disclosure is not limited by the terms as described below, and other terms referring to subjects having equivalent technical meanings may also be used.

In the following description, the terms "physical channel" and "signal" may be interchangeably used with the term "data" or "control signal". For example, the term "physical downlink shared channel (PDSCH)" refers to a physical channel over which data is transmitted, but the PDSCH may also be used to refer to the "data". In the disclosure, the expression "transmit ting a physical channel" may be construed as having the same meaning as the expression "transmitting data or a signal over a physical channel".

In the following description of the disclosure, upper signaling refers to a signal transfer scheme from a base station to a terminal via a downlink data channel of a physical layer, or from a terminal to a base station via an uplink data channel of a physical layer. The upper signaling may also be understood as radio resource control (RRC) signaling or a medium access control (MAC) control element (CE).

In the following description of the disclosure, terms and names defined in the 3rd generation partnership project new radio (3GPP NR) or 3GPP long term evolution (3GPP LTE) standards will be used for the sake of descriptive convenience. However, the disclosure is not limited by these terms and names, and may be applied in the same way to systems that conform other standards. The term "gNB" may be interchangeably used with the term "eNB" for the sake of descriptive convenience. That is, a base station described as "eNB" may indicate "gNB". Furthermore, the term "terminal" may refer to not only a mobile phone, an MTC device, an NB-IoT device, and a sensor, but also other wireless communication devices.

In the following description, a base station is an entity that allocates resources to terminals, and may be at least one of a gNode B (gNB), an eNode B (eNB), a Node B, a base station (BS), a wireless access unit, a base station controller, and a node on a network. A terminal may include a user equipment (UE), a mobile station (MS), a cellular phone, a smartphone, a computer, or a multimedia system capable of performing a communication function. The base station is not limited to the above examples.

In particular, the disclosure may be applied to 3GPP NR (5th generation mobile communication standard). The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology. In the disclosure, the term "eNB" may be interchangeably used with the term "gNB" for the sake of descriptive convenience. A base station described as "eNB" may indicate "gNB". In addition, the term "terminal" may refer to not only mobile phones, an NB-IoT devices, and sensors, but also other wireless communication devices.

A wireless communication system is advancing to a broadband wireless communication system for providing high-speed and high-quality packet data services using communication standards, such as high-speed packet access (HSPA) of 3GPP, LTE (long-term evolution or evolved universal terrestrial radio access (E-UTRA)), LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink refers, for example, to a radio link via which a user equipment (UE) or a mobile station (MS) transmits data or control signals to a base station (BS) or eNode B, and the downlink refers to a radio link via which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

According to various embodiments, eMBB may aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. The 5G communication system must provide an increased user-perceived data rate to the UE, as well as the maximum data rate. In order to satisfy such requirements, transmission/reception technologies including a further enhanced multiple-input multiple-output (MIMO) transmission technique may be required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

Additionally, mMTC is being considered to support application services such as the Internet of Things (IoT) in the 5G communication system. mMTC may have requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. The UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and may also requires a packet error rate of 10-5 or less. For the services supporting URLLC, a 5G system must provide a transmit time interval (TTI) shorter than those of other services, and may also may require a design for assigning a large number of resources in a frequency band in order to secure reliability of a communication link.

The above three services considered in the 5G communication system, that is, eMBB, URLLC, and mMTC, may be multiplexed and transmitted in a single system. Different transmission/reception techniques and transmission/reception parameters may be used between services in order to satisfy different requirements of the respective services. However, the above-described mMTC, URLLC, and eMBB are only examples of different types of services, and service types to which the disclosure is applicable are not limited to the above-described examples.

In the following description of embodiments of the disclosure, LTE, LTE-A, LTE Pro, or 5G (or NR, next-generation mobile communication) systems will be described by way of example, but the embodiments of the disclosure may be applied to other communication systems having similar backgrounds or channel types. In addition, based on determinations by those skilled in the art, the embodiments of the disclosure may be applied to other communication systems through some modifications without significantly departing from the scope of the disclosure.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1A is a diagram illustrating a structure of an NR system according to an embodiment of the disclosure.

Referring to FIG. 1A, a wireless communication system may be configured by several base stations (e.g., a gNB 1*a*-05, an ng-eNB 1*a*-10, an ng-eNB 1*a*-15, and a gNB 1*a*-20), an access and mobility management function (AMF) 1*a*-25, and a user plan function (UPF) 1*a*-30. The wireless communication system is not limited to the configuration illustrated in FIG. 1A and may include more or fewer elements. A user equipment (hereinafter, UE or terminal) 1*a*-35 may access an external network through the base stations (e.g., the gNB 1*a*-05, the ng-eNB 1*a*-10, the ng-eNB 1*a*-15, and the gNB 1*a*-20) and the UPF 1*a*-30.

In FIG. 1A, the base stations (e.g., the gNB 1*a*-05, the ng-eNB 1*a*-10, the ng-eNB 1*a*-15, and the gNB 1*a*-20) serve as access nodes of a cellular network, and may provide wireless access to terminals accessing the network. The base stations (e.g., the gNB 1*a*-05, the ng-eNB 1*a*-10, the ng-eNB 1*a*-15, and the gNB 1*a*-20) may, in order to service traffic of users, collect state information of terminals, such as a buffer state, an available transfer power state, and a channel state, and perform scheduling to support connection between the terminals and a core network (CN, particularly, a CN of NR is referred to as a 5GC).

In FIG. 1A, the gNBs 1*a*-05 and 1*a*-20 may control multiple cells, and an adaptive modulation and coding (hereinafter, referred to as AMC) scheme for determining a modulation scheme and a channel coding rate according to a channel state of a terminal may be applied.

In an embodiment, the core network is a device for performing various control functions as well as a mobility management function for a terminal, and may be connected to multiple base stations. In addition, the 5GC may be linked to an existing LTE system.

In a wireless communication system, a user plane (UP) related to transmission of real user data and a control plane (CP) such as connection management may be separately configured. The gNB 1*a*-05 and the gNB 1*a*-20 may use UP and CP technology defined in NR technology, and the ng-eNB 1*a*-10 and the ng-eNB 1*a*-15 may use UP and CP technology defined in long term evolution (LTE) technology although being connected to the 5GC.

The AMF 1*a*-25 is a device for performing various control functions as well as a mobility management function for a terminal, and is connected to multiple base stations. The UPF 1*a*-30 may, for example, indicate a kind of gateway device providing data transmission. Although not illustrated in FIG. 1A, an NR wireless communication system may include a session management function (SMF). The SMF may manage packet data network connection, such as a protocol data unit (PDU) provided to a terminal.

Figure 1B:
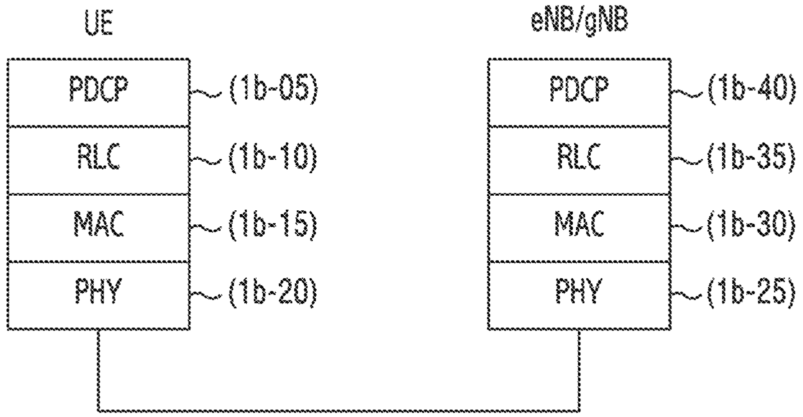
FIG. 1B is a diagram illustrating a wireless protocol structure of long term evolution (LTE) and NR systems according to an embodiment of the disclosure.

FIG. 1B is a diagram illustrating a wireless protocol structure of LTE and NR systems according to an embodiment of the disclosure.

Referring to FIG. 1B, a wireless protocol of an LTE system may include a packet data convergence protocol (PDCP) 1*b*-05 or 1*b*-40, a radio link control (RLC) 1*b*-10 or 1*b*-35, and a medium access control (MAC) 1*b*-15 or 1*b*-30 in each of a terminal and an ENB.

The packet data convergence protocol (PDCP) 1*b*-05 or 1*b*-40 may be responsible for an operation, such as internet protocol (IP) header compression/reconstruction, provide an in-order delivery or out-of-order delivery function, perform reordering, or provide a duplicate detection function, a retransmission function, or a ciphering and deciphering function. The functions of the PDCP are not limited to the above example.

The radio link control (hereinafter, referred to as RLC) 1*b*-10 or 1*b*-35 may reconfigure a PDCP protocol data unit (PDU) to have a proper size, provide an in-order delivery or out-of-order delivery function, and provide an automatic repeat request (ARQ) function, a concatenation, segmentation and reassembly function or re-segmentation function, a reordering function, a duplicate detection function, or an error detection function. The functions of the RLC are not limited to the above example.

The MAC 1*b*-15 or 1*b*-30 is connected to several RLC layer devices configured in a single terminal, and multiplexes RLC PDUs to a MAC PDU and demultiplexes a MAC PDU to RLC PDUs. In addition, the MAC may provide a mapping function, a scheduling information reporting function, a hybrid ARQ (HARQ) function, a function of priority handling between logical channels, a function of priority handling between terminals, a multimedia broadcast multicast service (MBMS) service identification function, a transport format selection function, and a padding function. The functions of the MAC are not limited to the above example.

A physical layer 1*b*-20 or 1*b*-25 performs channel coding and modulation of higher layer data, makes the data into OFDM symbols, and transmits the OFDM symbols through a wireless channel, or performs demodulation and channel decoding of OFDM symbols received through a wireless channel and then transfers the OFDM symbols to a higher layer. In addition, the physical layer also uses a hybrid ARQ (HARQ) for additional error correction, and a reception node may transmit information on whether a packet transmitted by a transmission node is received, by using 1 bit. The information is referred to as HARQ acknowledgment (ACK)/negative acknowledgement (NACK) information. Downlink HARQ ACK/NACK information for uplink data transmission is transmitted through a physical hybrid-ARQ indicator channel (PHICH) physical channel in LTE. In NR, since asynchronous HARQ is applied, whether retransmission or new transmission is required may be determined through scheduling information of a corresponding terminal in a physical downlink control channel (PDCCH) which is a channel through which downlink/uplink resource allocation is transmitted. Uplink HARQ ACK/NACK information for downlink data transmission may be transmitted through a physical uplink control channel (PUCCH) or physical uplink shared channel (PUSCH) physical channel. In general, a PUCCH is transmitted in the uplink of a primary cell (PCell) described later. However, if it is supported by a terminal, a PUCCH is additionally transmitted to the base station through a secondary cell (SCell) described later, and the SCell is called a PUCCH SCell.

Although not illustrated in this diagram, radio resource control (RRC) layers exist above the PDCP layers of the terminal and the base station, respectively, and the RRC layers may transmit or receive an access/measurement-related configuration control message for wireless resource control.

The PHY layer may be configured by one or multiple frequencies/carriers, and a technology in which multiple frequencies are simultaneously configured and used is called carrier aggregation technology (carrier aggregation, hereinafter, referred to as CA). Unlike using only one carrier for communication between a terminal (or user equipment or UE) and a base station (evolved universal mobile telecommunications system (UMTS) terrestrial radio access network (E-UTRAN) NodeB or eNB), CA technology additionally uses one or multiple subcarriers as well as a primary carrier, and thus may remarkably increase as much traffic as indicated by the number of the subcarriers. Meanwhile, in LTE, a cell in a base station using primary carriers is called a primary cell (PCell), and a cell in a base station using subcarriers is called a subcell or a secondary cell (SCell).

In addition, although not illustrated in this diagram, a wireless protocol of NR may further include a service data adaptation protocol (SDAP). A SDAP layer may transfer user data and provide a function of mapping between a quality of service (QoS) flow and a data bearer for uplink and downlink, a function of marking a QoS flow ID for uplink and downlink, and a function of mapping a reflective QoS flow to a data bearer for uplink SDAP PDUs. The operation of the SDAP is not limited to the above example.

Figure 1C:
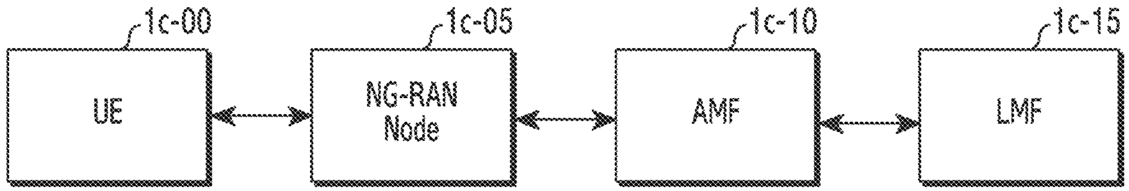
FIG. 1C is a diagram illustrating a network structure for providing a terminal location estimation service (location service, hereinafter, referred to as LCS) in a next generation mobile communication system according to an embodiment of the disclosure.

FIG. 1C is a diagram illustrating a network structure for providing a terminal location estimation service (location service, hereinafter, referred to as LCS) in a wireless mobile communication system according to an embodiment of the disclosure.

Referring to FIG. 1C, a network for providing an LCS in a wireless mobile communication system is configured by a terminal 1*c*-00, a base station (NG-RAN node) 1*c*-05, an access and mobility function (AMF) 1*c*-10, and a location management function (LMF) 1*c*-15. The user terminal 1*c*-00 communicates with the LMF 1*c*-15 via the base station 1*c*-05 and the AMF 1*c*-05 and transmits or receives information required for location estimation. The role of each element for LCS provision is as follows.

The terminal (UE) 1*c*-00 may, for example, perform the role of measuring a wireless signal required for location estimation and transferring a result of the measurement to the LMF 1*c*-15.

The base station 1*c*-05 may perform the role of transmitting a downlink wireless signal required for location estimation and measuring an uplink wireless signal transmitted by a target terminal.

The AMF 1*c*-10 may perform the role of receiving an LCS request message from an LCS requester and then transferring same to the LMF 1*c*-15 to indicate provision of a location provision service. When the LMF 1*c*-15 processes a location estimation request and then responds with a location estimation result of the terminal, the AMF 1*c*-10 may transfer the result to the LCS requester.

The LMF 1*c*-15 is a device for receiving an LCS request from the AMF 1*c*-10 and processing same, and may perform the role of controlling an overall process required for location estimation. For terminal location estimation, the LMF 1*c*-15 provides assistance information required for location estimation and signal measurement to the terminal 1*c*-00 and receives a location estimation result and a location estimation signal measurement result value, and may use an LTE positioning protocol (LPP) as a protocol for data exchange. In an embodiment, the LPP may define the specification of a message exchanged between the terminal 1*c*-00 and the LMF Ic-15 for a location estimation service. In addition, the LMF 1*c*-15 may transmit or receive, also to or from the base station 1*c*-05, downlink reference signal (positioning reference signal, hereinafter, referred to as a PRS) configuration information and an uplink reference signal (sounding reference signal, hereinafter, referred to as an SRS) measurement result to be used for location estimation. In this case, NR positioning protocol A (NRPPa) may be used as a protocol for data exchange, and NRPPa may define the specification of a message transmitted or received between the base station 1*c*-05 and the LMF 1*c*-15. The LMF 1*c*-15 is a network entity and may be called an LMF entity.

Figure 1D:
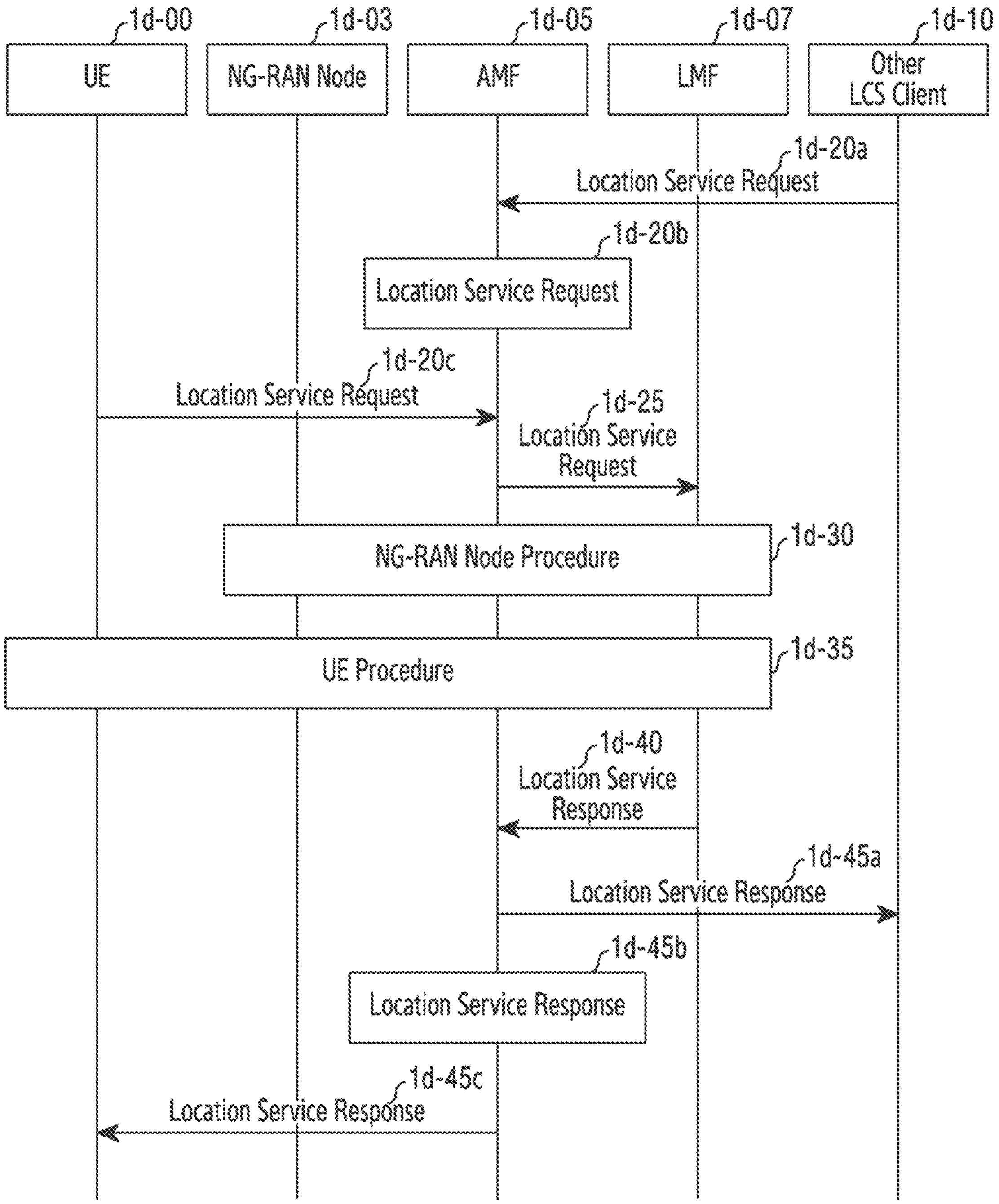
FIG. 1D is a flowchart of a process of performing an LCS in a next generation mobile communication system according to an embodiment of the disclosure.

FIG. 1D is a flowchart of a process of performing an LCS in a wireless mobile communication system according to an embodiment of the disclosure.

Referring to FIG. 1D, an AMF 1*d*-05 may receive an LCS request 1*d*-20*a*, 1*d*-20*b*, or 1*d*-20*c* and then transfer same to an LMF 1*d*-07. The LMF 1*d*-07 may then control a process of exchanging required information with a terminal and a base station to process the LCS request 1*d*-20*a*, 1*d*-20*b*, or 1*d*-20*c*, and transfer a result value thereof (location estimation result) to the AMF 1*d*-05. The AMF 1*d*-05 may transfer the result value thereof (location estimation result) to an entity having requested an LCS, so that LCS performing may be completed.

In operation 1*d*-20, the LCS request received by the AMF 1*d*-05 may include the following three types.

1. The LCS request 1*d*-20*a* received from an external LCS client 1*d*-10
2. The LCS request 1*d*-20*b* autonomously generated by the AMF 1*d*-05
3. The LCS request 1*d*-20*c* received from a UE 1*d*-00

The LCS request may include an ID of a terminal subject to the LCS and LCS quality-of-service (QoS) request information (e.g., requirements for latency and an accuracy level of location estimation).

After receiving one of the three types of LCS requests, the AMF 1*d*-05 may transmit a location service request message 1*d*-25 to the LMF 1*d*-07 to request provision of a location estimation service. In an operation of an NG-RAN node procedure 1*d*-30, the LMF 1*d*-07 may proceed with a procedure required for location estimation (e.g., configuration of base station PRS, securing of base station SRS measurement information, etc.) through NRPPa message exchange with an NG-RAN node 1*d*-03. In addition, in a UE procedure operation 1*d*-35, the LMF 1*d*-07 may exchange an LPP message to exchange pieces of required information with the terminal 1*d*-00. Therefore, the LMF 1*d*-07 may proceed with a procedure, such as exchange of terminal capability (UE capability) information related to location estimation, transfer of assistance information for signal measurement of the terminal, and requesting and acquisition of a terminal measurement result. When the LMF 1*d*-07 determines an estimated location of the terminal, based on obtained several measurement results, the LMF 1*d*-07 may transfer a location service response message 1*d*-40 to the AMF 1*d*-05. The AMF 1*d*-05 may transfer an LCS response message 1*d*-45*a*, 1*d*-45*b*, or 1*d*-45*c* to the entity having requested the LCS, and the LCS response message 1*d*-45*a*, 1*d*-45*b*, or 1*d*-45*c* may include a terminal location estimation result.

The name of a request or a message described in the disclosure is not limited to the name mentioned in the disclosure, and may be expressed by a different name, based on the characteristics or nature of the request or message. A request or message may be expressed by a first request (or message) or a second request (or message).

Figure 1E:
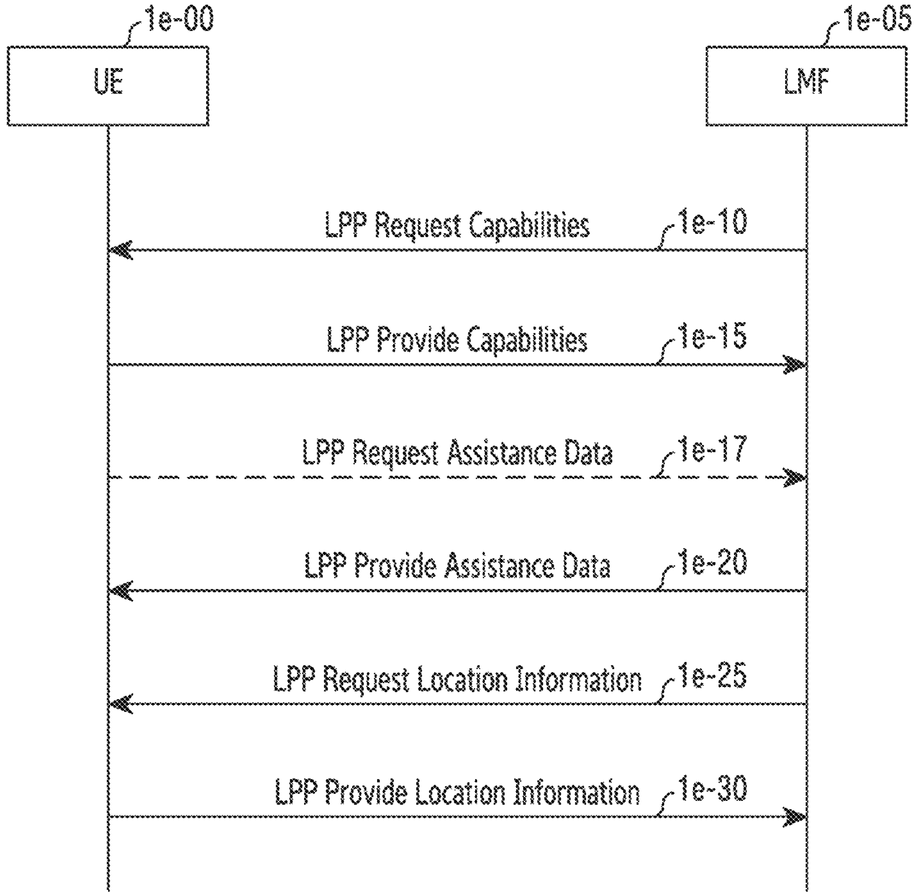
FIG. 1E is a flowchart of a process of exchanging an LTE positioning protocol (LPP) message between a terminal and a location management function (LMF) according to an embodiment of the disclosure.

FIG. 1E is a flowchart of a detailed process of exchanging an LTE positioning protocol (LPP) message in the UE procedure operation 1*d*-35 illustrated in FIG. 1D according to an embodiment of the disclosure.

FIG. 1E illustrates a process in which an LMF 1*e*-05 proceeds with a procedure, such as exchange of terminal capability (hereinafter, referred to as UE capability) information related to location estimation with a terminal 1*e*-00, transfer of assistance information for signal measurement of the terminal, and requesting and acquisition of a terminal measurement result. The use and definition of each LPP message exchanged in each operation are as follows.

LPP Request Capabilities (LMF→UE) 1*e*-10 may be used for the LMF 1*e*-05 to request pieces of UE capability information related to location estimation from the terminal 1*e*-00. Information included in the message may be defined as shown in Table 1. A request for common information irrelevant to a location estimation method (e.g., global navigation satellite system (GNSS), observed time difference of arrival (OTDOA), enhanced cell ID (ECID), etc.) is included in a predetermined message (e.g., CommonIEsRequestCapabilities), and a request for information additionally required for each location estimation method may be included in a separate information element (IE) for a corresponding method.

TABLE 1

```
RequestCapabilities ::= SEQUENCE {
criticalExtensions   CHOICE {
  c1                 CHOICE {
    requestCapabilities-r9   RequestCapabilities-r9-IEs,
    spare3 NULL, spare2 NULL, spare1 NULL
  },
  criticalExtensionsFuture SEQUENCE { }
}
}
RequestCapabilities-r9-IEs ::= SEQUENCE {
commonIEsRequestCapabilities   CommonIEsRequestCapabilities
OPTIONAL, -- Need ON
  a-gnss-RequestCapabilities       A-GNSS-RequestCapabilities
  OPTIONAL, -- Need ON
  otdoa-RequestCapabilities        OTDOA-RequestCapabilities
  OPTIONAL, -- Need ON
  ecid-RequestCapabilities   ECID-RequestCapabilities
OPTIONAL, -- Need ON
  epdu-RequestCapabilities   EPDU-Sequence
OPTIONAL, -- Need ON
  ...,
  [[ sensor-RequestCapabilities-r13  Sensor-RequestCapabilities-r13
OPTIONAL, -- Need ON
    tbs-RequestCapabilities-r13      TBS-RequestCapabilities-r13
```

TABLE 1-continued

```
    OPTIONAL, -- Need ON
      wlan-RequestCapabilities-r13   WLAN-RequestCapabilities-r13
  OPTIONAL, -- Need ON
      bt-RequestCapabilities-r13     BT-RequestCapabilities-r13
  OPTIONAL -- Need ON
    ]],
    [[ nr-ECID-RequestCapabilities-r16     NR-ECID-
RequestCapabilities-r16     OPTIONAL, -- Need ON
      nr-Multi-RTT-RequestCapabilities-r16
                                   NR-Multi-RTT-RequestCapabilities-
r16
  OPTIONAL, -- Need ON
      nr-DL-AoD-RequestCapabilities-r16
                                   NR-DL-AoD-RequestCapabilities-r16
  OPTIONAL, -- Need ON
      nr-DL-TDOA-RequestCapabilities-r16
                                   NR-DL-TDOA-RequestCapabilities-
r16OPTIONAL, -- Need ON
      nr-UL-RequestCapabilities-r16    NR-UL-RequestCapabilities-
r16OPTIONAL -- Need ON
    ]]
    }
```

LPP Provide Capabilities (UE→LMF) 1*e*-15 may be used for the terminal 1*e*-00 to transfer pieces of UE capability information requested by the LMF 1*e*-05. Information included in the message may be defined as shown in Table 2. Similarly to the LPP Request Capabilities message, common information irrelevant to a location estimation method is included in commonIEsProvideCap abilities, and pieces of information requested for respective location tracking methods may be included in separate IEs.

TABLE 2

```
  ProvideCapabilities ::= SEQUENCE {
  criticalExtensions       CHOICE {
    c1                     CHOICE {
      provideCapabilities-r9       ProvideCapabilities-r9-IEs,
      spare3 NULL, spare2 NULL, spare1 NULL
    },
    criticalExtensionsFuture SEQUENCE { }
  }
  }
  ProvideCapabilities-r9-IEs ::= SEQUENCE {
  commonIEsProvideCapabilities     CommonIEsProvideCapabilities
OPTIONAL,
  a-gnss-ProvideCapabilities       A-GNSS-ProvideCapabilities
  OPTIONAL,
  otdoa-ProvideCapabilities        OTDOA-ProvideCapabilities
OPTIONAL,
  ecid-ProvideCapabilities     ECID-ProvideCapabilities
OPTIONAL,
  epdu-ProvideCapabilities     EPDU-Sequence
OPTIONAL,
  ...,
  [[ sensor-ProvideCapabilities-r13   Sensor-ProvideCapabilities-r13
OPTIONAL,
    tbs-ProvideCapabilities-r13       TBS-ProvideCapabilities-r13
OPTIONAL,
    wlan-ProvideCapabilities-r13    WLAN-ProvideCapabilities-r13
OPTIONAL,
    bt-ProvideCapabilities-r13        BT-ProvideCapabilities-r13
OPTIONAL
  ]],
  [[ nr-ECID-ProvideCapabilities-r16   NR-ECID-ProvideCapabilities-r16
    OPTIONAL,
    nr-Multi-RTT-ProvideCapabilities-r16
                                   NR-Multi-RTT-ProvideCapabilities-r16
OPTIONAL,
    nr-DL-AoD-ProvideCapabilities-r16
                                   NR-DL-AoD-ProvideCapabilities-r16
OPTIONAL,
    nr-DL-TDOA-ProvideCapabilities-r16
                                   NR-DL-TDOA-ProvideCapabilities-r16
OPTIONAL,
    nr-UL-ProvideCapabilities-r16   NR-UL-ProvideCapabilities-r16
```

TABLE 2-continued

```
OPTIONAL
  ]]
  }
```

In an embodiment, LPP requestAssistanceData (UE→LMF) 1*e*-17 may be used for request, from the LMF 1*e*-05, pieces of information that are necessary or helpful for the terminal 1*e*-00 to perform wireless signal measurement for location estimation. Information included in the message may be defined as shown in Table 3. Common information irrelevant to a location estimation method is included in commonIEsRequestAssistanceData, and pieces of information requested for respective location tracking methods may be included in separate IEs.

TABLE 3

```
RequestAssistanceData ::= SEQUENCE {
  criticalExtensions CHOICE {
    c1 CHOICE {
      requestAssistanceData-r9 RequestAssistanceData-r9-IEs,
      spare3 NULL, spare2 NULL, spare1 NULL
      },
    criticalExtensionsFuture SEQUENCE { }
    }
}
RequestAssistanceData-r9-IEs ::= SEQUENCE {
  commonIEsRequestAssistanceData
CommonIEsRequestAssistanceData OPTIONAL,
  a-gnss-RequestAssistanceData A-GNSS-RequestAssistanceData
OPTIONAL,
  otdoa-RequestAssistanceData OTDOA-RequestAssistanceData
OPTIONAL,
  epdu-RequestAssistanceData EPDU-Sequence OPTIONAL,
  ...,
  [[ sensor-RequestAssistanceData-r14
  Sensor-RequestAssistanceData-r14 OPTIONAL,
  tbs-RequestAssistanceData-r14 TBS-RequestAssistanceData-r14
OPTIONAL,
  wlan-RequestAssistanceData-r14 WLAN-RequestAssistanceData-
r14 OPTIONAL
  ]],
  [[ nr-Multi-RTT-RequestAssistanceData-r16 NR-Multi-RTT-
RequestAssistanceData-r16 OPTIONAL,
  nr-DL-AoD-RequestAssistanceData-r16 NR-DL-AoD-
RequestAssistanceData-r16 OPTIONAL,
  nr-DL-TDOA-RequestAssistanceData-r16 NR-DL-TDOA-
RequestAssistanceData-r16 OPTIONAL
  ]]
}
```

In another embodiment, LPP ProvideAssistanceData (LMF→UE) 1*e*-20 may be used for the LMF 1*e*-05 to provide pieces of information that are necessary or helpful for the terminal 1*e*-00 to perform wireless signal measurement for location estimation. Information included in the message may be defined as shown in Table 4. Common information irrelevant to a location estimation method is included in commonIEsProvideAssistanceData, and pieces of information provided for respective location tracking methods may be included in separate IEs.

TABLE 4

```
Provide AssistanceData ::= SEQUENCE {
  criticalExtensions CHOICE {
    c1 CHOICE {
      provide AssistanceData-r9 ProvideAssistanceData-r9-IEs,
      spare3 NULL, spare2 NULL, spare1 NULL
      },
    criticalExtensionsFuture SEQUENCE { }
    }
```

TABLE 4-continued

```
}
Provide AssistanceData-r9-IEs ::= SEQUENCE {
  commonIEsProvideAssistanceData
CommonIEsProvideAssistanceData OPTIONAL, -- Need ON
  a-gnss-ProvideAssistanceData A-GNSS-ProvideAssistanceData
OPTIONAL, -- Need ON
  otdoa-ProvideAssistanceData OTDOA-ProvideAssistanceData
OPTIONAL, -- Need ON
  epdu-Provide-Assistance-Data EPDU-Sequence
  OPTIONAL, -- Need ON
  ...,
  [[
  sensor-ProvideAssistanceData-r14 Sensor-
ProvideAssistanceData-r14 OPTIONAL, -- Need ON
  tbs-ProvideAssistanceData-r14 TBS-
ProvideAssistanceData-r14 OPTIONAL, -- Need ON
  wlan-ProvideAssistanceData-r14 WLAN-
  ProvideAssistanceData-r14
OPTIONAL -- Need ON
  ]],
  [[ nr-Multi-RTT-ProvideAssistanceData-r16
  NR-Multi-RTT-ProvideAssistanceData-r16
  OPTIONAL, -- Need ON
  nr-DL-AoD-ProvideAssistanceData-r16
  NR-DL-AoD-ProvideAssistanceData-r16
  OPTIONAL, -- Need ON
  nr-DL-TDOA-ProvideAssistanceData-r16
  NR-DL-TDOA-ProvideAssistanceData-r16
  OPTIONAL -- Need ON
  ]]
}
```

In yet another embodiment, LPP Request Location Information (LMF→UE) 1*e*-25 may be used for the LMF 1*e*-05 to request, from the terminal 1*e*-00, signal measurement required for location estimation and a location estimation result. The LMF 1*e*-05 may determine which location estimation method to be used, which measurement the terminal needs to perform for the location estimation method, and how to respond with which result, and then include pieces of relevant information in the message and transfer same to the terminal 1*e*-C. Information included in the message may be defined as shown in Table 5.

TABLE 5

```
RequestLocationInformation ::= SEQUENCE {
  criticalExtensions CHOICE {
    c1 CHOICE {
      requestLocationInformation-r9 RequestLocationInformation-
      r9-IEs, spare3 NULL, spare2 NULL, spare1 NULL
      },
    criticalExtensionsFuture SEQUENCE { }
    }
}
RequestLocationInformation-r9-IEs ::= SEQUENCE {
  commonIEsRequestLocationInformation
  CommonIEsRequestLocationInformation OPTIONAL, -- Need ON
  a-gnss-RequestLocationInformation A-GNSS-
RequestLocationInformation OPTIONAL, -- Need ON
  otdoa-RequestLocationInformation OTDOA-
RequestLocationInformation OPTIONAL, -- Need ON
  ecid-RequestLocationInformation ECID-
RequestLocationInformation OPTIONAL, -- Need ON
  epdu-RequestLocationInformation EPDU-Sequence
  OPTIONAL, -- Need ON
  ...,
  [[
  sensor-RequestLocationInformation-r13
  Sensor-RequestLocationInformation-r13
  OPTIONAL, -- Need ON
  tbs-RequestLocationInformation-r13 TBS-
RequestLocationInformation-r13 OPTIONAL, -- Need ON
  wlan-RequestLocationInformation-r13 WLAN-
RequestLocationInformation-r13 OPTIONAL, -- Need ON
  bt-RequestLocationInformation-r13 BT-
```

TABLE 5-continued

```
RequestLocationInformation-r13 OPTIONAL -- Need ON
    ]],
    [[ nr-ECID-RequestLocationInformation-r16
    NR-ECID-RequestLocationInformation-r16
    OPTIONAL, -- Need ON
    nr-Multi-RTT-RequestLocationInformation-r16
    NR-Multi-RTT-RequestLocationInformation-r16
    OPTIONAL, -- Need ON
    nr-DL-AoD-RequestLocationInformation-r16
    NR-DL-AoD-RequestLocationInformation-r16
    OPTIONAL, -- Need ON
    nr-DL-TDOA-RequestLocationInformation-r16
    NR-DL-TDOA-RequestLocationInformation-r16
    OPTIONAL -- Need ON
    ]]
  }
```

In an embodiment, LPP Provide Location Information (UE→LMF) 1*e*-30 may be used for the terminal 1*e*-00 to transfer, to the LMF 1*e*-05, a measurement result and a location estimation result having been requested by the LMF 1*e*-05. Information included in the message may be defined as shown in Table 6.

TABLE 6

```
ProvideLocationInformation ::= SEQUENCE {
  criticalExtensions CHOICE {
    c1 CHOICE {
      provideLocationInformation-r9 ProvideLocationInformation-
      r9-IEs, spare3 NULL, spare2 NULL, spare1 NULL
      },
    criticalExtensionsFuture SEQUENCE { }
    }
}
ProvideLocationInformation-r9-IEs ::= SEQUENCE {
  commonIEsProvideLocationInformation
  CommonIEsProvideLocationInformation OPTIONAL,
  a-gnss-ProvideLocationInformation A-GNSS-
ProvideLocationInformation OPTIONAL,
  otdoa-ProvideLocationInformation OTDOA-
ProvideLocationInformation OPTIONAL,
  ecid-ProvideLocationInformation ECID-ProvideLocationInformation
OPTIONAL,
  epdu-ProvideLocationInformation EPDU-Sequence OPTIONAL,
  ...,
  [[
  sensor-ProvideLocationInformation-r13
  Sensor-ProvideLocationInformation-r13
  OPTIONAL,
  tbs-ProvideLocationInformation-r13 TBS-
ProvideLocationInformation-r13 OPTIONAL,
  wlan-ProvideLocationInformation-r13 WLAN-
ProvideLocationInformation-r13 OPTIONAL,
  bt-ProvideLocationInformation-r13 BT-ProvideLocationInformation-
r13 OPTIONAL
  ]],
  [[ nr-ECID-ProvideLocationInformation-r16
  NR-ECID-ProvideLocationInformation-r16 OPTIONAL,
  nr-Multi-RTT-ProvideLocationInformation-r16
  NR-Multi-RTT-ProvideLocationInformation-r16 OPTIONAL,
  nr-DL-AoD-ProvideLocationInformation-r16
  NR-DL-AoD-ProvideLocationInformation-r16 OPTIONAL,
  nr-DL-TDOA-ProvideLocationInformation-r16
  NR-DL-TDOA-ProvideLocationInformation-r16 OPTIONAL
  ]]
}
```

The names of requests or messages described in the disclosure are not limited to the names mentioned in the disclosure, and may be expressed by different names, based on the characteristics or nature of the requests or messages.

Figure 1F:
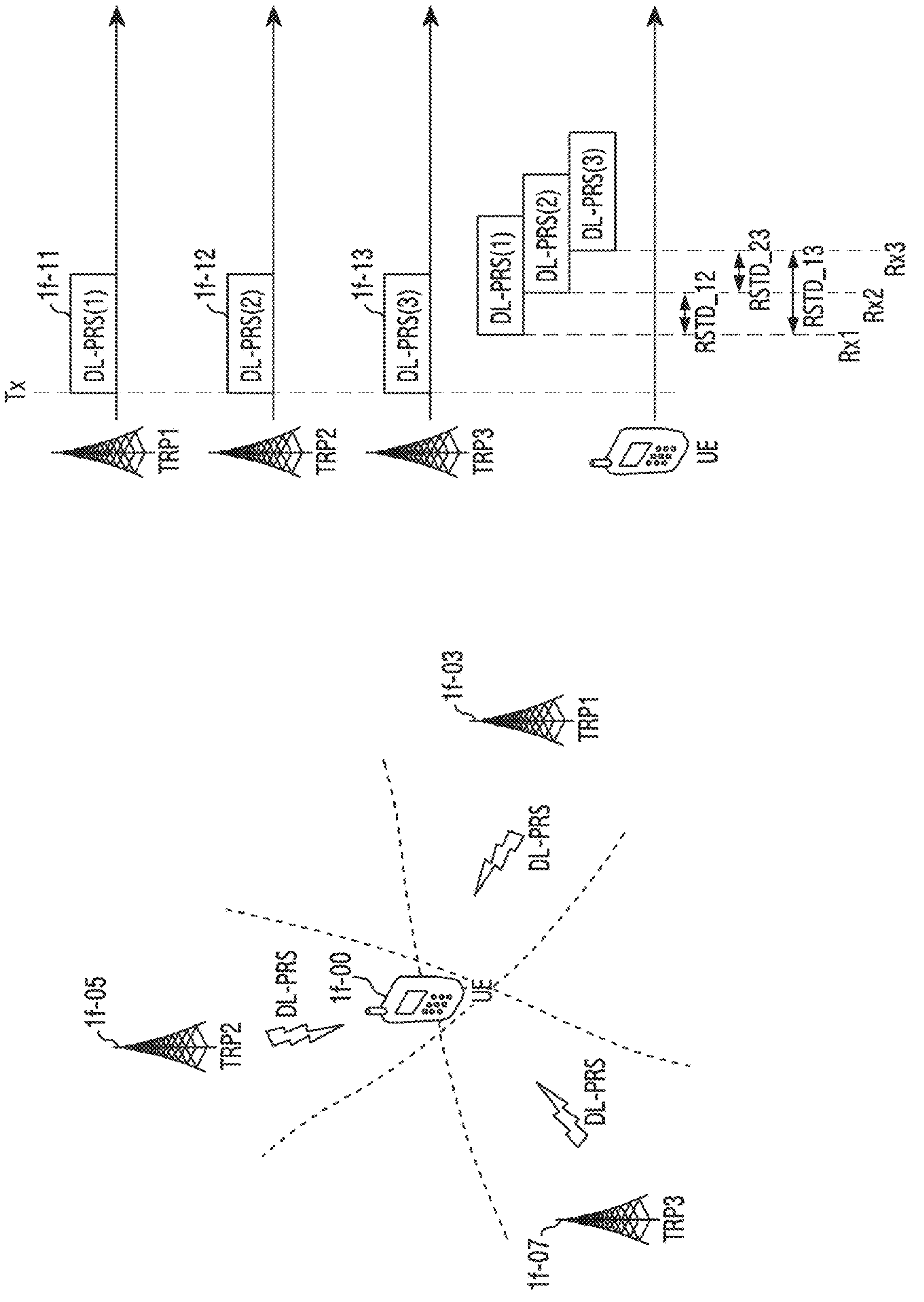
FIG. 1F is a diagram illustrating a scenario of estimating the location of a terminal, based on a DL-PRS transmitted by a transmission and reception point (TRP) according to an embodiment of the disclosure.

FIG. 1F is a diagram illustrating a scenario of estimating the location of a terminal, based on a DL-PRS transmitted by a TRP according to an embodiment of the disclosure.

Referring to FIG. 1F, a terminal 1*f*-00 may receive multiple DL-PRSs 1*f*-11, 1*f*-12, and 1*f*-13 transmitted by multiple different TRPs 1*f*-03, 1*f*-05, and 1*f*-07, respectively. Timing information (reception time information) on a timing at which the terminal has received each DL-PRS may be used for location estimating of the terminal. For example, in a case where a location estimation method of a downlink time difference of arrival (DL-TDOA) scheme is used, the terminal may measure/calculate a different value (reference signal timing difference, RSTD) between the time points at which the terminal has received DL-PRSs transmitted by different TRPs. The terminal having received the DL-PRSs transmitted by the three different TRPs may measure/calculate three RSTD values 1*f*-15 for respective TRP pairs. Thereafter, a hyperbola 1*f*-17 obtained by connecting, with lines, the positions on which a corresponding RSTD value is measurable, may be generated with respect to each RSTD value, and the terminal may be estimated to be located within an area in which three hyperbolas 1*f*-17 overlap with each other.

There are DL-TDOA, Multi-round trip time (RTT), etc., as techniques of estimating the location of a terminal by using timing information on a timing at which the terminal has received each of DL-PRSs transmitted by different TRPs. In a case of the Multi-RTT technique, the location of a terminal is estimated using an RTT value measured through the process in which the terminal receives a DL-PRS transmitted by a TRP and the TRP receives a UL-SRS transmitted by the terminal. In this case, a circle is generated by connecting, with a line, positions at which a corresponding RTT value is measurable, based on RTT values measured between respective TRPs and a terminal, and the terminal may be estimated to be located within an area in which multiple circles overlap with each other. In a case of the DL-TDOA and Multi-RTT schemes, the location of a terminal is estimated based on timing information on a timing at which the terminal receives a DL-PRS signal transmitted by a TRP for location estimation. The accuracy of location estimation may be affected by how accurately a terminal detects a DL-PRS signal while receiving a wireless signal and how precisely the terminal measures a detection time point. This DL-PRS detection performance and accuracy of measurement of a detection time point may be further improved when a DL-PRS is transmitted using a wider bandwidth. Therefore, in order to improve the location estimation accuracy of a terminal, DL-PRSs transmitted through different positioning frequency layers (PFLs) may be aggregated as shown in FIG. 1G.

Figure 1G:
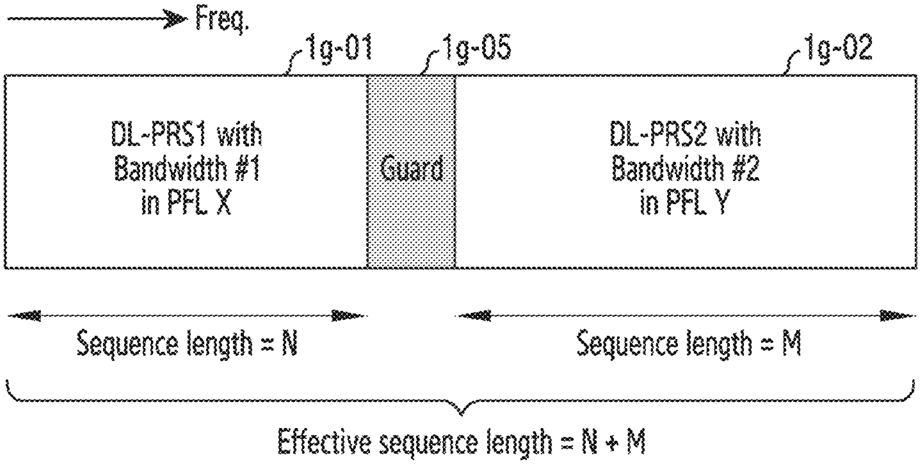
FIG. 1G is a diagram illustrating a scenario in which different DL-PRSs transmitted on different positioning frequency layers (PFLs) are aggregated according to an embodiment of the disclosure.

FIG. 1G is a diagram illustrating a scenario in which different DL-PRSs transmitted on different positioning frequency layers (PFLs) are aggregated according to an embodiment of the disclosure.

Referring to FIG. 1G, in order to improve the accuracy of location estimation when location estimation techniques (DL-TDOA, Multi-RTT, etc.) based on a DL-PRS reception time point are used, different DL-PRSs transmitted on different positioning frequency layers (PFLs) may be aggregated. In a case where DL-PRSs transmitted on different PFLs are aggregated, a terminal may recognize the DL-PRSs as one DL-PRS having merged in the frequency domain, detect the DL-PRS, and measure a detection time point.

For example, when DL-PRS1 1*g*-01 having a sequence length of N is transmitted on PFL X by using bandwidth #1, and DL-PRS2 1*g*-02 having a sequence length of M is transmitted on PFL Y by using bandwidth #2, DL-PRS1 1*g*-01 and DL-RPS2 1*g*-02 may be aggregated. In a case where DL-PRS1 and DL-RPS2 are aggregated, the terminal may perform joint measurement (or aggregated measurement) for DL-PRS1 and DL-RPS2. In a case where the terminal performs joint measurement for DL-PRS1 1g-01 and DL-RPS2 1g-02, the terminal may recognize DL-PRS1 and DL-RPS2 as one DL-PRS having a length of N+M and being transmitted using as wide of a bandwidth as bandwidth #1+bandwidth #2, perform DL-PRS detection, and measure a detection time point. The wider the bandwidth used to transmit a wireless signal in the frequency domain, the higher the resolution of the wireless signal in the time domain. Therefore, when the terminal performs joint measurement for aggregated DL-PRS1 and DL-RPS2, the terminal may more precisely measure the detection time point of the aggregated DL-PRS. In addition, in general, the longer the sequence length of a reference signal (RS), the greater the performance of the terminal to detect the RS in a received wireless signal. Therefore, different DL-PRSs transmitted on different PFLs are aggregated, thereby enabling improvement of the accuracy of location estimation when location estimation techniques (DL-TDOA, Multi-RTT, etc.) based on a DL-PRS reception time point are used. (Hereinafter, for convenience of explanation, an operation of aggregating different DL-PRSs transmitted on different PFLs in order to improve location accuracy is shortly expressed by "DL-PRS BW aggregation". Aggregated DL-PRSs are expressed by an "aggregated DL-PRS", and PFLs on which aggregated DL-PRSs are transmitted are expressed by an "aggregated PFL".)

In order to aggregate different DL-PRSs transmitted on different PFLs in the frequency domain and then measure same as one DL-PRS, a distance 1g-05 (guard size) between resources on which the DL-PRSs to be aggregated in the frequency domain are transmitted may be ensured to be a predetermined level (about 12 resource elements) or lower. DL-PRS BW aggregation may be performed for 2 or 3 consecutive PFLs positioned in the same band in the frequency domain. Aggregation may be performed for DL-PRS resources satisfying the following conditions.

The conditions of DL-PRS resources for performing aggregation according to an embodiment of the disclosure may be as follows.

For example, DL-PRS resources may be positioned in the same slot or symbol in the time domain.

DL-PRS resources may have the same periodicity and slot offset.

DL-PRS resources may have the same muting pattern.

DL-PRS resources may have the same NR-DL-PRS-SFN0-Offset value.

DL-PRS resources may be transmitted through the same antenna reference point (ARP) and the same RF chain from the same TRP.

DL-PRS resources may be transmitted through the same number of symbols.

DL-PRS resources may have the same repetition factor value.

DL-PRS resources may be transmitted using the same numerology (the same cyclic prefix, the same subcarrier spacing).

DL-PRS resources may be transmitted through the same or different bandwidths.

DL-PRS resources may have the same comb size.

DL-PRS resources may have the same transmission power per subcarrier.

DL-PRS resources may ensure phase continuity between aggregated PFLs.

Figure 1H:
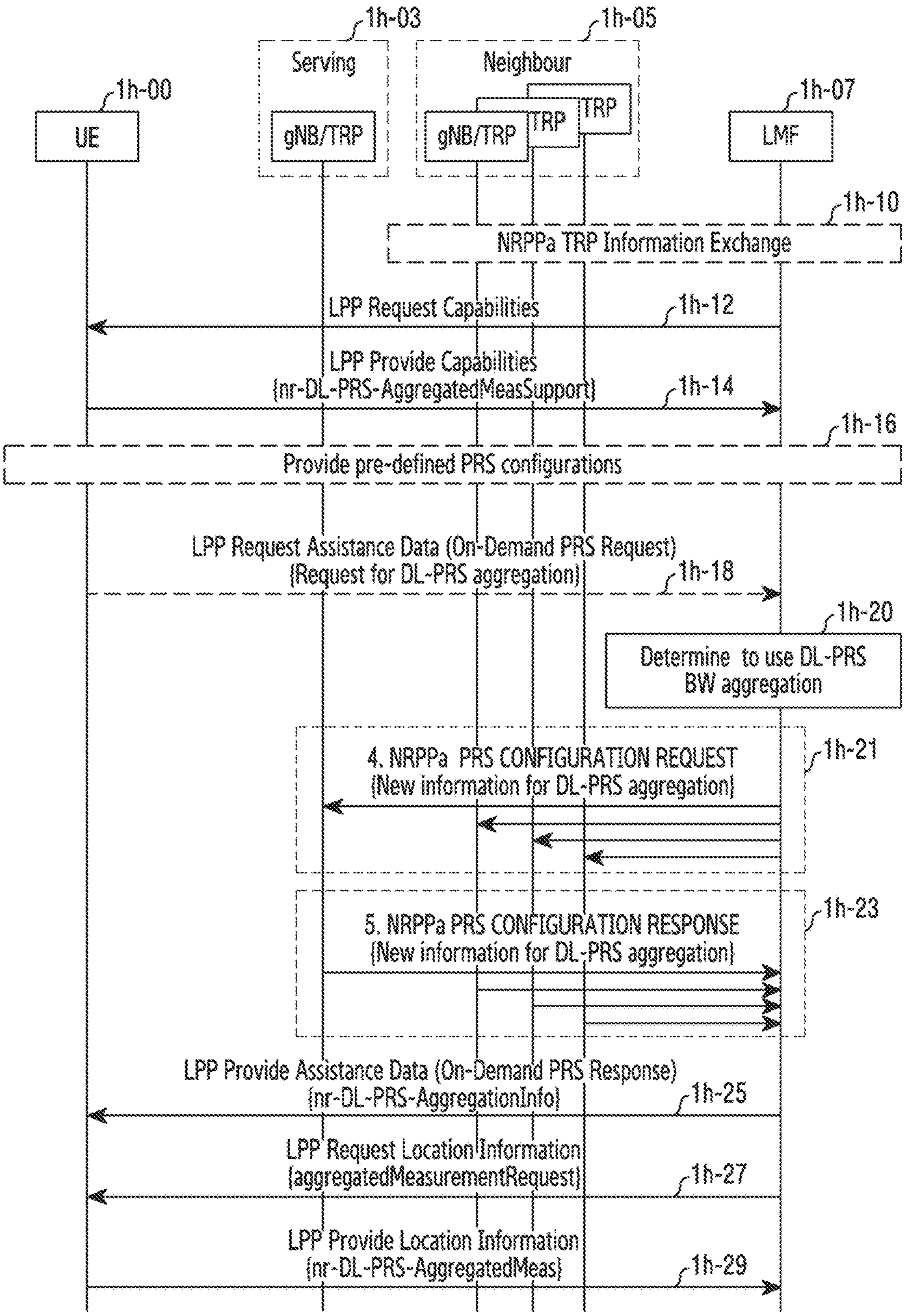
FIG. 1H is a flowchart of a signaling process for using DL-PRS BW aggregation to estimate the location of a terminal according to an embodiment of the disclosure.
Figure 1I:
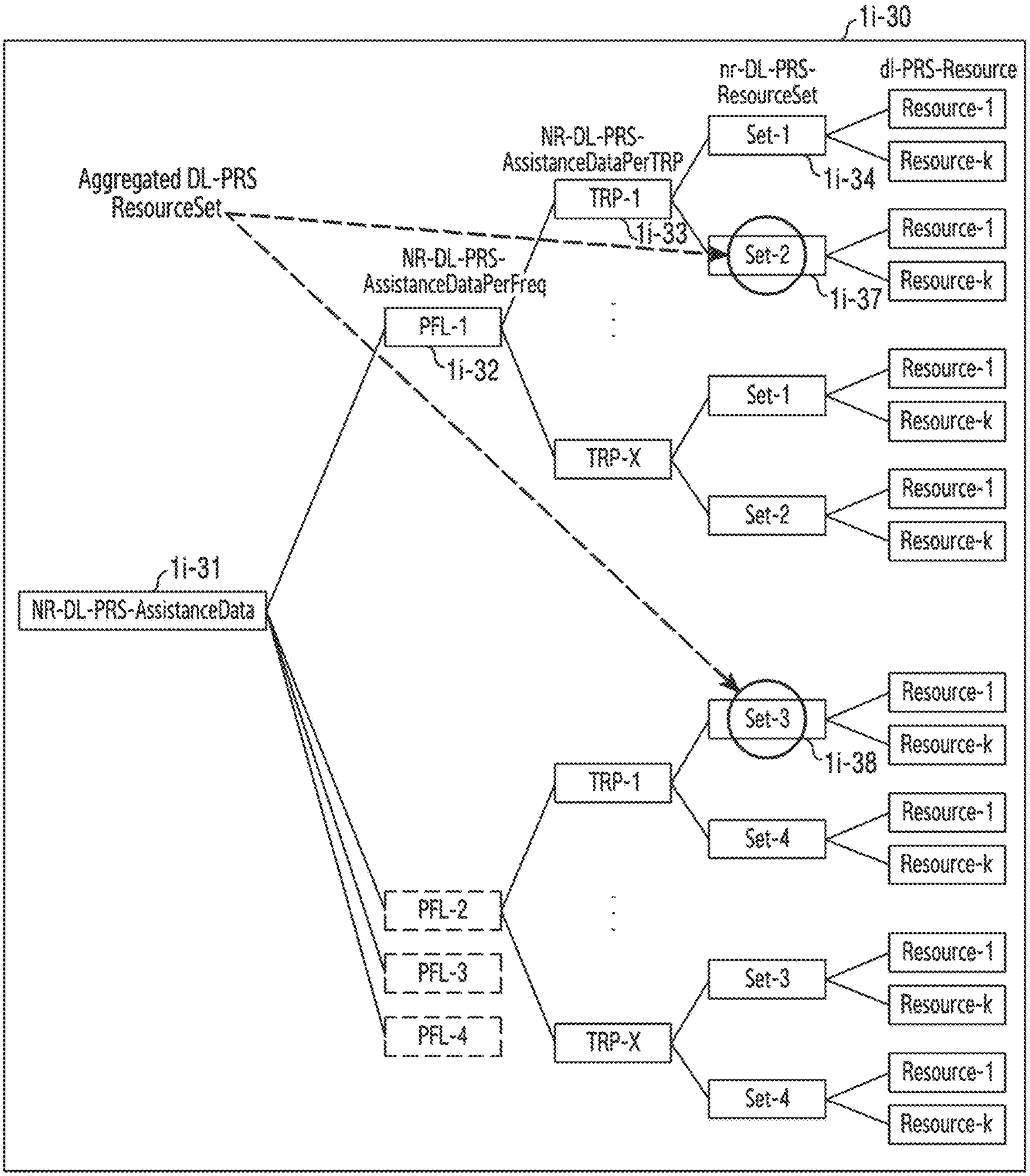

FIG. 1H is a flowchart of a signaling process for using DL-PRS BW aggregation to estimate the location of a terminal according to an embodiment of the disclosure.

Referring to FIG. 1H, a terminal **1*h*-00 may report UE capability information 1*h*-12 related to a DL-PRS BW aggregation operation to an LMF 1*h*-07 and transfer a requirement 1*h*-18 related to the DL-PRS BW aggregation operation to the LMF 1*h*-07 if necessary. If it is determined that the DL-PRS BW aggregation operation is needed (1*h*-20), the LMF 1*h*-07 may request TRPs (1*h*-03, 1*h*-05) to aggregate DL-PRS resources (1*h*-21) and provide specific relevant requirements. Thereafter, the TRPs (1*h*-03, 1*h*-05) may provide configuration information 1*h*-23 on the aggregated DL-PRS resources to the LMF 1*h*-07. Then, the LMF 1*h*-07 may provide aggregated DL-PRS configuration information 1*h*-25 to the terminal and indicate joint measurement (or aggregated measurement) for the aggregated DL-PRS resources (1*h*-27). The terminal may perform joint measurement according to the indication of the LMF 1*h*-07 and then report a result value thereof (a location estimation result and a location estimation signal measurement result) to the LMF 1*h*-07**. Specific signaling procedures for operations may be described as follows.

In operation **1*h*-10, the LMF 1*h*-07** may receive pieces of TRP information related to a location estimation operation from base stations which are usable for location estimation of the terminal. More specifically, the TRP information may include physical location information of a TRP, cell information on a cell transmitted by the TRP (NR physical cell identity (PCI), NR cell global identity (CGI), NR absolute frequency channel number (ARFCN), etc.), PRS configuration information on a PRS transmitted by the TRP, and on-demand PRS TRP information (in other words, PRS configuration options that the terminal or the LMF is able to request from the TRP if necessary).

In operation **1*h*-12, the LMF 1*h*-07 may request terminal capability information (UE capability information) related to the location estimation operation from a terminal subject to location estimation through an LPP Request Capabilities message. Pieces of specific information included in the LPP Request Capabilities message are the same as described in the part 1*e*-10 of FIG. 1**E.

In operation **1*h*-14, the terminal 1*h*-00 may report the terminal capability information related to the location estimation operation to the LMF 1*h*-07 through an LPP Provide Capabilities message. Pieces of specific information included in the LPP Provide Capabilities message are the same as described in the part 1*e*-15 of FIG. 1**E.

The terminal **1*h*-00 may include terminal capability information related to whether a DL-PRS BW aggregation operation is supported, in the LPP Provide Capabilities message. Specifically, a combination of at least one of pieces of information may be defined and configured in the LPP Provide Capabilities message to report terminal capability information related to the DL-PRS BW aggregation operation to the LMF 1*h*-07**. The name of information (or parameter, indicator, field, etc.) described in the disclosure is not limited to the name mentioned in the disclosure, and may be expressed by a different name, based on the characteristics or nature of the information (or parameter, indicator, field, etc.). Alternatively, information may be expressed by first information (or parameter, indicator, field, etc.) or second information.

Support of the aggregated measurement: This is a 1-bit indicator showing whether aggregated measurement (or joint measurement) is performable for aggregated DL-PRS resources. Aggregated measurement (or joint measurement)

may indicate an operation of, when different DL-PRS resources transmitted on different PFLs are aggregated, recognizing the aggregated DL-PRS resources as one DL-PRS and performing DL-PRS detection and measurement of a reception time point. The indicator may be defined in an NR-DL-TDOA-ProvideCapabilities IE and NR-Multi-RTT-ProvideCapabilities IE in the same form as nr-DL-PRS-AggregatedMeasSupport-r18 ENUMERAGED {supported}.

In an embodiment, the maximum number of PFLs used for aggregation: This is an indicator showing a maximum supported number of PFLs used for DL-PRS BW aggregation. In other words, the indicator may indicate a maximum number of PFLs from which aggregated DL-PRSs are transmitted, the aggregated DL-PRSs being subject to aggregated measurement a terminal is able to perform. The indicator may be defined in the same form as maxSupportedAggregatedFreqLayers-r18 INTEGER (2 . . . 3), and may be defined and configured in the unit of UEs, bands, or PFL combinations as below.

A per terminal (UE) indicator (per UE indication) may be a parameter included in NR-DL-PRS-Resources(Processing)Capability.

A per band indicator (per band indication) may be a parameter included in PRS-Processing(Resources)CapabilityPerBand.

A per PFL combination indicator (per PFL combination indication) may be a parameter included in PRS-Processing(Resources)CapabilityPerPFL-Comb. The maximum aggregated bandwidth: This is an indicator indicating a maximum bandwidth size available for a DL-PRS BW aggregation operation. The indicator may indicate a maximum bandwidth size in which a terminal is able to perform aggregated measurement for aggregated DL-PRSs. The indicator may be defined in the same form as supportedBandwidthAggregationPRS-r18 ENUMERATED {mhz50, mhz100, mhz150, mhz200, mhz400, mhz800 . . . }, and may be defined and configured in the unit of UEs, bands, or PFL combinations as below.

A per terminal (UE) indicator (per UE indication) may be a parameter included in NR-DL-PRS-Resources(Processing)Capability.

A per band indicator (per band indication) may be a parameter included in PRS-Processing(Resources)CapabilityPerBand.

A per PFL combination indicator (per PFL combination indication) may be a parameter included in PRS-Processing(Resources)CapabilityPerPFL-Comb.

The maximum number of PRS resources processed in a slots over the aggregation: This is an indicator indicating a maximum number of aggregated DL-PRS resources per slot that a terminal is able to process (or measure). The indicator may be, for example, defined in the same form as maxNumOfAggregatedDL-PRS-ResProcessedPerSlot-r18 ENUMERATED {n1, n2, n4, n8, n16, n24, n32, n48, n64}, and may be defined and configured in the unit of UEs, bands, or PFL combinations as below.

A per terminal (UE) indicator (per UE indication) may be a parameter included in NR-DL-PRS-ProcessingCapability.

A per band indicator (per band indication) may be a parameter included in PRS-ProcessingCapabilityPerBand A per PFL combination indicator (per PFL combination indication) may be a parameter included in PRS-Processing(Resources)CapabilityPerPFL-Comb.

In operation **1*h*-16, the terminal may receive DL-PRS-Assistance data and a pre-defined PRS configuration through positioning system information (posSI) transmitted by the base station or an LPP Provide Assistance Data message transmitted by the LMF 1*h*-07. The DL-PRS-Assistance data indicates pieces of configuration information of a DL-PRS being transmitted by a current TRP, and the pre-defined PRS configuration may indicate DL-PRS configuration options that the terminal may request later if necessary. Detailed contents included in the DL-PRS-Assistance data are as described in operation 1*h*-25. The Pre-defined PRS configuration may include one or multiple pieces of On-Demand-DL-PRS-Configuration information, and each piece of On-Demand-DL-PRS-Configuration information is configured by dl-prs-configuration-id, nr-DL-PRS-PositioningFrequencyLayer, and nr-DL-PRS-Info. Eventually, DL-PRS configuration information configurable on a particular PFL is given for each dl-prs-configuration-id. Operation 1*h*-16** may be omitted according to some cases.

In operation **1*h*-18, the terminal may request, from the LMF 1*h*-07 and through an LPP Request Assistance Data message, pieces of information that are necessary or helpful to measure a wireless signal (e.g., DL-PRS) for location estimation. Pieces of specific information included in the LPP Request Assistance Data message are the same as described in the part 1*e*-17 of FIG. 1**E.

If there is a separate requirement for a DL-PRS configuration required for location estimation, the terminal may include an NR-On-Demand-DL-PRS-Request IE in the LPP Request Assistance Data message. The terminal may include a pre-defined PRS configuration ID in the NR-On-Demand-DL-PRS-Request IE to request one of pre-defined PRS configurations received in operation **1*h*-16**, or may more directly include specific values for DL-PRS configuration parameters to request a required DL-PRS configuration. The DL-PRS configuration parameters requested by the terminal and included in the NR-On-Demand-DL-PRS-Request IE are as follows. The name of information (or parameter, indicator, field, etc.) described in the disclosure is not limited to the name mentioned in the disclosure, and may be expressed by a different name, based on the characteristics or nature of the information (or parameter, indicator, field, etc.). Alternatively, information may be expressed by first information (or parameter, indicator, field, etc.) or second information.

dl-prs-StartTime-and-Duration: This indicates a requested DL-PRS transmission start time and a transmission duration time value. The start time (dl-prs-start-time) is a time from a time point at which NR-On-Demand-DL-PRS-Request is received to a time point at which DL-PRS transmission starts, and may have a value of 1-1024 seconds. The transmission duration time (dl-prs-duration) value indicates a time length for which dl-prs transmission is maintained, and may have a value between 0 and 23 hours 59 minutes 59 seconds.

dl-prs-ResourceSetPeriodicityReq: This indicates a requested transmission period value of a DL-PRS resource set. This may be requested in the unit of PFLs. The transmission period value is configurable in the unit of slots, and a configurable maximum number of slots differs according to an SCS value used in DL-PRS transmission, but the transmission period value may be a value between 0 and 10.24 seconds as an absolute time value. For reference, a DL-PRS resource set is a set of several DL-PRS resources, and DL-PRS resources included in the same DL-PRS resource set are transmitted according to the same period and may have the same symbol length.

dl-prs-NumSymbolsReq: This indicates a requested number of symbols of a DL-PRS resource (the number of symbols on which the DL-PRS resource is transmitted). This may be requested in the unit of PFLs, and the number of symbols may be one of 2, 4, 6, and 12.

dl-prs-FrequencyRangeReq: This indicates a requested transmission frequency band (FR1 or FR2) of a DL-PRS. This may be requested in the unit of PFLs.

dl-prs-ResourceBandwidthReq: This indicates a requested bandwidth of a DL-PRS resource. This may be requested in the unit of PFLs. The bandwidth value may be a value between 24 PRBs and 272 PRBs.

dl-prs-ResourceRepetitionFactorReq: This indicates a requested repetition count of a DL-PRS resource. This may be requested in the unit of PFLs. The repetition count may have one value among 2, 4, 6, 8, 16, and 32.

dl-prs-CombSizeN-Req: This indicates a requested resource element (RE) gap between symbols of a DL-PRS. This may be requested in the unit of PFLs. The requested combSize value may be one value among 2, 4, 6, and 12.

When the terminal wants to use a DL-PRS BW aggregation operation to improve the accuracy of location estimation, the terminal may include a combination of at least one of pieces of information in an NR-On-Demand-DL-PRS-Request IE to request the LMF to perform DL-PRS aggregation. The pieces of information for requesting DL-PRS aggregation are as follows.

1 bit indicator to request DL-PRS BW aggregation: This is a 1-bit indicator for requesting DL-PRS BW aggregation, and may be defined and configured in an NR-On-Demand-DL-PRS-Request IE.

Aggregated DL-PRS BW: This is an indicator for indicating a requested bandwidth of an aggregated DL-PRS, and may be defined and configured in an NR-On-Demand-DL-PRS-Request IE. Alternatively, an extension field (e.g., a dl-prs-ResourceBandwidthReqExt-r18 field is defined) that may indicate a wider bandwidth exceeding 272 PRBs beyond an existing configuration range (24 PRBs-272 PRBs) of a dl-prs-ResourceBandwidthReq-r17 field having been configured in an NR-On-Demand-DL-PRS-Per-FreqLayer-r17 IE in the unit of PFLs may be defined. The terminal may request a DL-PRS BW equal to or greater than 272 PRBs by using an extension field in an NR-On-Demand-DL-PRS-PerFreqLayer-r17 IE, and the LMF may interpret the request as an implicit DL-PRS BW aggregation request.

A number of PFLs to use for DL-PRS BW aggregation: This is an indicator for requesting the number of PFLs to be used in DL-PRS BW aggregation, and may be defined and configured in an NR-On-Demand-DL-PRS-Request IE. The indicator may have a value of 2 or 3.

Set of PFLs to use for BW DL-PRS aggregation: This is an indicator for requesting a combination of PFLs to be used in DL-PRS BW aggregation and may be defined and configured in an NR-On-Demand-DL-PRS-Request IE. The indicator may indicate one or more PFL combinations in the form of a list.

Additional information for DL-PRS aggregation: If an indicator (a set of PFLs to use for BW DL-PRS aggregation) is configured in an NR-On-Demand-DL-PRS-Request IE, the terminal may include specific configuration information (e.g., Aggregated DL-PRS BW, CombSizeN, Periodicity, Repetition Factor, etc.) together for each PFL combination.

In operation **1*h*-20, the LMF 1*h*-07 may determine to use DL-PRS BW aggregation for location estimation of the terminal, based on previously collected pieces of information (e.g., terminal capability information provided by the terminal in operation 1*h*-14, on-demand DL-PRS configuration information requested by the terminal in operation 1*h*-18, and LCS QoS request information received in operation 1*d*-25 of FIG. 1**D).

In operation **1*h*-21, if DL-PRS configuration resources for each TRP having been provided from base stations in operation 1*h*-10 for location estimation of the terminal are determined not to be enough or proper, the LMF 1*h*-07 may request a new DL-PRS resource configuration from a base station through an NRPPa PRS CONFIGURATION REQUEST message. DL-PRS configuration information (Requested DL PRS Transmission Characteristics) requested for each of multiple TRPs may be included in the NRPPa PRS CONFIGURATION REQUEST message. Pieces of information included in Requested DL PRS Transmission Characteristics may be the same as information included in the NR-On-Demand-DL-PRS-Request IE provided by the terminal to the LMF 1*h*-07 in operation 1*h*-18**.

When the LMF **1*h*-07 determines to use DL-PRS BW aggregation for location estimation of the terminal in operation 1*h*-20, the LMF may request a base station to aggregate DL-PRS resources (DL-PRS resourceSet or resources) transmitted through different PFLs, through the NRPPa PRS CONFIGURATION REQUEST message 1*h*-21. To this end, the LMF 1*h*-07 may include, in the NRPPa PRS CONFIGURATION REQUEST message 1*h*-21, pieces of information related to DL-PRS BW aggregation among pieces of information included in the NR-On-Demand-DL-PRS-Request IE provided by the terminal 1*h*-00 to the LMF 1*h*-07 in operation 1*h*-18. However, if DL-PRS configuration resources for each TRP having been provided from base stations in operation 1*h*-10 are enough or proper (in other words, DL-PRS configuration resources being transmitted by TRPs have already been aggregated), the LMF may omit operation 1*h*-21** in a case where a DL-PRS BW aggregation operation is determined to be used.

In operation **1*h*-23, when the LMF 1*h*-07 transfers a request for a DL-PRS configuration through the NRPPa PRS CONFIGURATION REQUEST message 1*h*-21 in operation 1*h*-21, the base station may change a DL-PRS transmission configuration, based on the request, include changed DL-PRS configuration information in an NRPPa PRS CONFIGURATION RESPONSE 1*h*-23, and then transmit same to the LFM 1*h*-07**. If DL-PRS resources (DL-PRS resourceSet or DL-PRS resources) included in DL-PRS configuration information are aggregated, an aggregated DL-PRS ResourceSet/resources may be indicated.

In operation **1*h*-25, the LMF 1*h*-07 may provide DL-PRS configuration information (NR-DL-PRS-AssistanceData) of neighboring base stations to the terminal 1*h*-00 through an LPP Provide Assistance Data message. If the terminal includes an NR-On-Demand-DL-PRS-Request IE in an LPP request Assistance Data message and transfers same to the LMF in operation 1*h*-18**, the terminal may interpret DL-PRS configuration information (NR-DL-PRS-AssistanceData) included in the LPP Provide Assistance Data message as a response (On-Demand PRS Response) for NR-On-Demand-DL-PRS-Request information.

FIG. 11 illustrates pieces of DL-PRS configuration information **1*i*-30** included in an LPP Provide Assistance Data message according to an embodiment of the disclosure.

An IE of NR-DL-PRS-AssistanceData **1*i*-31 may include DL-PRS configuration information 1*i*-32 (NR-DL-PRS-AssistanceDataPerFreq) for one or each of multiple PFLs. In addition, each NR-DL-PRS-AssistanceDataPerFreq1*i*-32 may include DL-PRS configuration information 1*i*-33 (NR-DL-PRS-AssistanceDataPerTRP) for one or each of multiple TRPs together with configuration information (NR- DL-PRS-PositioningFrequencyLayer) for a PFL. NR-DL-PRS-AssistanceDataPerTRP 1*i*-33 may include information (nr-DL-PRS-Info) on a DL-PRS resource set transmitted from a corresponding TRP together with an ID (dl-PRS-ID) of each TRP and cell information (nr-PhysCellID, nr-Cell-GlobalID, and nr-ARFCN) on a cell operated by each TRP, in the form of a list of one or multiple values of nr-DL-PRS-ResourceSet 1*i*-34. nr-DL-PRS-ResourceSet may include, in the form of a list, configurations 1*i*-35** (dl-PRS-Resource) on one or multiple DL-PRS resources belonging to a corresponding DL-PRS Resource set together with an ID (nr-DL-PRS-ResourceSetID) of each DL-PRS resource set and pieces of information (e.g., periodicity, slot offset, repetitionfactor, number of symbols, . . . ) configured in the unit of resource sets.

An LMF may indicate, to a terminal, which DL-PRS resources have been aggregated among several DL-PRS resources included in NR-DL-PRS-Assistance Data, for a DL-PRS BW aggregation operation. To this end, the LMF may indicate whether resources have been aggregated, in the unit of DL-PRS resource sets. For reference, according to conditions enabling aggregation of DL-PRS resources described with reference to FIG. 1G, aggregated DL-PRS resource sets may be configured by 2-3 DL-PRS resource sets (e.g., a DL-PRS resource set **1*i*-37 (Set-2) transmitted on PFL-1 by TRP-1 and a DL-PRS resource set 1*i*-38 (Set-3) transmitted on PFL-2**) transmitted on different PFLs from the same TRP (e.g., TRP-1). The LMF may, for example, use one or more of the methods described below as a method for indicating aggregated DL-PRS resource sets among several DL-PRS resource sets included in NR-DL-PRS-Assistance-Data.

Method 1 (including DL-PRS aggregation information in an NR-DL-PRS-AssistanceData IE): In an NR-DL-PRS-AssistanceData IE, a new field (e.g., nr-DL-PRS-AggregationInfo-r18) for indicating an aggregated DL-PRS resource set is defined, and the corresponding field may indicate a list of information (NR-DL-PRS-AggregationInfo-r18 IE) for indicating a combination of aggregated DL-PRS resource sets in the unit of TRPs, as shown in Table 7.

TABLE 7

```
NR-DL-PRS-AssistanceData-r16 ::= SEQUENCE {
   nr-DL-PRS-ReferenceInfo-r16                    DL-PRS-ID-
Info-r16,
   nr-DL-PRS-AssistanceDataList-r16        SEQUENCE (SIZE
(1..nrMaxFreqLayers-r16)) OF
        NR-DL-PRS-AssistanceDataPerFreq-r16,
   nr-SSB-Config-r16                              SEQUENCE
(SIZE (1 .. nrMaxTRPs-r16)) OF
        NR-SSB-Config-r16OPTIONAL, -- Need ON
        ...
   [[
   nr-DL-PRS-AggregationInfo-r18 SEQUENCE (SIZE (1..nrMaxTRPs-
r16)) OF NR-DL-PRS-AggregationInfo-r18 OPTIONAL,
   ]]
   }
```

The NR-DL-PRS-AggregationInfo-r18 IE may include information for indicating aggregated DL-PRS resource sets in the unit of TRPs. Therefore, the NR-DL-PRS-AggregationInfo-r18 IE may include a particular TRP id (dl-PRS-ID) and one or multiple aggregation combinations (i.e., aggregated DL-PRS resource set combinations) of DL-PRS resource sets transmitted by the TRP. In this case, one of two methods may be used as a method for representing an aggregation combination of DL-PRS resource sets.

Method 1-1 (using dl-PRS-AggregationID): An ID value maybe assigned to each of aggregation combinations (or aggregated DL-PRS resource set combinations) of DL-PRS resource sets transmitted by a particular TRP. In a case where an ID value is assigned to each aggregation combination, when the LMF requests the terminal to perform DL-PRS measurement for a particular aggregation combination in operation **1*h*-27 or the terminal reports a DL-PRS measurement result for a particular aggregation combination in operation 1*h*-29**, the ID value may be used so as to reduce a signaling load between the LMF and the terminal. When method 1-1 is used, an NR-DL-PRS-AggregationInfo-r18 IE may be configured as shown in Table 8.

TABLE 8

```
NR-DL-PRS-AggregationInfo-r18 ::= SEQUENCE {
dl-PRS-ID-r16                  INTEGER (0..255),
nr-DL-PRS-AggregationList-r18    SEQUENCE (SIZE
(1..nrMaxAggregationPerTRP-r18)) OF NR-DL-PRS-Aggregation-r18
OPTIONAL,
}
NR-DL-PRS-Aggregation-r18 ::= SEQUENCE {
dl-PRS-AggregationID-r18    DL-PRS-AggregationID-r18,
(Method A: List of resource sets)
Nr-DL-PRS-AggregatedSets-r18    SEQUENCE (SIZE (2..3)) OF NR-
DL-PRS-ResourceSetID-r16
(Method B: Use of BIT STRING)
Nr-DL-PRS-AggregatedSets-r18    BIT STRING (SIZE(8))
}
DL-PRS-AggregationID-r18 ::= INTEGER
(0..nrMaxAggregationPerTRP-1-r18)
```

In Table 8, a dl-prs-ID-r16 field included in an NR-DL-PRS-AggregationInfo-r18 IE may indicate which TRP to which aggregation information represented by DL-PRS aggregation information included in the IE relates, by using an ID value of the TRP. In addition, an nr-DL-PRS-AggregationList-r18 field may indicate aggregation combinations (NR-DL-PRS-Aggregation-r18 IEs) of DL-PRS resource sets transmitted by a corresponding TRP in the form of a list. Each NR-DL-PRS-Aggregation-r18 IE may indicate an ID value (dl-PRS-AggregationID-r18) of a corresponding aggregation combination and 2-3 aggregated DL-PRS resource sets. A DL-PRS-AggregationID value may be, for example, defined to be an integer value between 0 and an nrMaxAggregationPerTRP-1-r18 value, and the nrMaxAggregationPerTRP value means a maximum number of DL-PRS aggregation combinations allowed for each TRP. As a method for indicating an aggregated DL-PRS resource set for each aggregation combination, a method (method A) of using a list of NR-DL-PRS-ResourceSetID or a method (method B) of using a bitmap of 8 bits may be used. For reference, when method B is used, aggregated DL-PRS resource sets may be indicated by configuring "1" as a bit at a position corresponding to an aggregated DL-PRS resource set among a maximum of 8 DL-PRS resource sets allocated for each TRP. When method A is used, 3 bits are used to indicate each DL-PRS-ResourceSetID, and thus 6-9 bits are used to indicate 2-3 aggregated DL-PRS resource sets. On the other hand, when method B is used, 8 bits are fixedly used. Therefore, in a case where the number of aggregated DL-PRS resource sets is normally expected to be 2, the signaling load may be reduced when method A is used, and in a case where the number is 3, using method B is advantageous in view of the signaling load.

Method 1-2 (not using dl-PRS-AggregationID): An aggregation combination (i.e., aggregated DL-PRS resource set combination) of DL-PRS resource sets transmitted by a particular TRP may be indicated in the form of a list without IDs as shown in Table 9. In a case where an aggregation combination is directly indicated without ID values, as much of a signaling load as indicated by the number of bits representing ID values may be reduced in operation 1*h*-25. However, it is impossible to use ID values to indicate a particular aggregation combination at the time of indicating DL-PRS measurement and reporting a measurement result in operations 1*h*-27 and 1*h*-29 in the future, and thus the entire signaling load may be actually increased.

TABLE 9

```
NR-DL-PRS-AggregationInfo-r18 ::= SEQUENCE {
  dl-PRS-ID-r16                INTEGER (0..255),
  nr-DL-PRS-AggregatedSetList-r18   SEQUENCE (SIZE
(1..nrMaxAggregationPerTRP-r18)) OF NR-DL-PRS-
AggregatedSet-r18
  }
  (Method A: List of resource sets)
NR-DL-PRS-AggregatedSet-r18 ::= SEQUENCE (SIZE (2..3))
OF NR-DL-PRS-ResourceSetID-r16
  (Method B: Use of BIT STRING)
NR-DL-PRS-AggregatedSet-r18 ::= BIT STRING (SIZE(8))
```

In Table 9, a dl-prs-ID-r16 field included in an NR-DL-PRS-AggregationInfo-r18 IE may indicate which TRP to which aggregation information represented by DL-PRS aggregation information included in the IE relates, by using an ID value of the TRP. In addition, an nr-DL-PRS-AggregatedSetList-r18 field may indicate aggregation combinations (NR-DL-PRS-AggregatedSet-r18 IEs) of DL-PRS resource sets transmitted by a corresponding TRP in the form of a list. Each NR-DL-PRS-AggregatedSet-r18 r18 IE may indicate 2-3 aggregated DL-PRS resource sets. As a method for indicating an aggregated DL-PRS resource set for each aggregation combination, a method (method A) of using a list of NR-DL-PRS-ResourceSetID or a method (method B) of using a bitmap of 8 bits may be used. When method B is used, aggregated DL-PRS resource sets may be indicated by configuring "1" as a bit at a position corresponding to an aggregated DL-PRS resource set among a maximum of 8 DL-PRS resource sets allocated for each TRP. When method A is used, 3 bits are used to indicate each DL-PRS-ResourceSetID, and thus 6-9 bits are used to indicate 2-3 aggregated DL-PRS resource sets. On the other hand, when method B is used, 8 bits are fixedly used. Therefore, in a case where the number of aggregated DL-PRS resource sets is normally expected to be 2, the signaling load may be reduced when method A is used, and in a case where the number is 3, using method B is advantageous in view of the signaling load.

Method 2 (including DL-PRS aggregation information in an NR-DL-PRS-AssistanceDataPerTRP IE): An NR-DL-PRS-AssistanceDataPerTRP IE may include one or multiple aggregation combinations (i.e., aggregated DL-PRS resource set combinations) of DL-PRS resource sets transmitted by a corresponding TRP. In this case, one of two methods may be used as a method for representing an aggregation combination of DL-PRS resource sets.

Method 2-1 (using dl-PRS-AggregationID): An ID value may be assigned to each of aggregation combinations (i.e., aggregated DL-PRS resource set combinations) of DL-PRS resource sets transmitted by a particular TRP. In a case where an ID value is assigned to each aggregation combination, when the LMF requests the terminal to perform DL-PRS measurement for a particular aggregation combination in operation 1*h*-27 or the terminal reports a DL-PRS measurement result for a particular aggregation combination in operation 1*h*-29, the ID value may be used so as to reduce a signaling load between the LMF and the terminal. When this method is used, an NR-DL-PRS-AggregationInfo-r18 IE may be configured as shown in Table 10.

TABLE 10

```
NR-DL-PRS-AssistanceDataPerTRP-r16 ::= SEQUENCE {
    dl-PRS-ID-r16                               INTEGER
(0..255),
    nr-PhysCellID-r16                         NR-PhysCellID-r16
    OPTIONAL, -- Need ON
    nr-CellGlobalID-r16                       NCGI-r15
      OPTIONAL, -- Need ON
    nr-ARFCN-r16                                ARFCN-
ValueNR-r15        OPTIONAL, -- Need ON
    nr-DL-PRS-SFN0-Offset-r16                 NR-DL-PRS-SFN0-
Offset-r16,
    nr-DL-PRS-ExpectedRSTD-r16                INTEGER (-
3841..3841),
    nr-DL-PRS-ExpectedRSTD-Uncertainty-r16
  INTEGER (0..246),
    nr-DL-PRS-Info-r16                        NR-DL-PRS-Info-r16,
    ...,
    [[
      prs-OnlyTP-r16                            ENUMERATED
{ true }   OPTIONAL -- Need ON
    ]],
    [[
      nr-DL-PRS-ExpectedAoD-or-AoA-r17
                                                      NR-DL-
PRS-ExpectedAoD-or-AoA-r17 OPTIONAL -- Need ON
    ]],
   [[
    nr-DL-PRS-AggregationList-r18   SEQUENCE (SIZE
(1..nrMaxAggregationPerTRP-r18)) OF NR-DL-PRS-Aggregation-r18
OPTIONAL,
    ]]
  }
  NR-DL-PRS-Aggregation-r18 ::= SEQUENCE {
  dl-PRS-AggregationID-r18      DL-PRS-AggregationID-r18,
  (Method A: List of resource sets)
  Nr-DL-PRS-AggregatedSets-r18   SEQUENCE (SIZE (2..3)) OF
NR-DL-PRS-ResourceSetID-r16
(Method B: Use of BIT STRING)
  Nr-DL-PRS-AggregatedSets-r18   BIT STRING (SIZE(8))
  }
  DL-PRS-AggregationID-r18 ::= INTEGER
(0..nrMaxAggregationPerTRP-1-r18)
```

In Table 10, an nr-DL-PRS-AggregationList-r18 field may indicate aggregation combinations (NR-DL-PRS-Aggregation-r18 IEs) of DL-PRS resource sets transmitted by a corresponding TRP in the form of a list. Each NR-DL-PRS-Aggregation-r18 IE may indicate an ID value (dl-PRS-AggregationID-r18) of a corresponding aggregation combination and 2-3 aggregated DL-PRS resource sets. A DL-PRS-AggregationID value may be defined to be an integer value between 0 and an nrMaxAggregationPerTRP-1-r18 value, and the nrMaxAggregationPerTRP value indicates a maximum number of DL-PRS aggregation combinations allowed for each TRP. As a method for indicating an aggregated DL-PRS resource set for each aggregation combination, a method (method A) of using a list of NR-DL-PRS-ResourceSetID or a method (method B) of using a bitmap of 8 bits may be used. When method B is used, aggregated DL-PRS resource sets may be indicated by configuring "1" as a bit at a position corresponding to an aggregated DL-PRS resource set among a maximum of 8 DL-PRS resource sets allocated for each TRP. When method A is used, 3 bits are used to indicate each DL-PRS-ResourceSetID, and thus 6-9 bits are used to indicate 2-3 aggregated DL-PRS resource sets. On the other hand, when method B is used, 8 bits are fixedly used. In a case where the number of aggregated DL-PRS resource sets is normally expected to be 2, the signaling load may be reduced when method A is used, and in a case where the number is 3, using method B is advantageous in view of the signaling load.

Method 2-2 (not using dl-PRS-AggregationID): An aggregation combination (i.e., aggregated DL-PRS resource set combination) of DL-PRS resource sets transmitted by a particular TRP may be indicated in the form of a list without IDs as shown in Table 11. For reference, in a case where an aggregation combination is directly indicated without ID values, as much of a signaling load as indicated by the number of bits representing ID values may be reduced in operation 1*h*-25. However, it is impossible to use ID values to indicate a particular aggregation combination at the time of indicating DL-PRS measurement and reporting a measurement result in operations 1*h*-27 and 1*h*-29 in the future, and thus the entire signaling load may be actually increased.

TABLE 11

```
NR-DL-PRS-AssistanceDataPerTRP-r16 ::= SEQUENCE {
    dl-PRS-ID-r16                       INTEGER
(0..255),
    nr-PhysCellID-r16                   NR-PhysCellID-r16
    OPTIONAL, -- Need ON
    nr-CellGlobalID-r16                 NCGI-r15
      OPTIONAL, -- Need ON
    nr-ARFCN-r16                        ARFCN-
ValueNR-r15      OPTIONAL, -- Need ON
    nr-DL-PRS-SFN0-Offset-r16           NR-DL-PRS-SFN0-
Offset-r16,
    nr-DL-PRS-ExpectedRSTD-r16          INTEGER (-
3841..3841),
    nr-DL-PRS-ExpectedRSTD-Uncertainty-r16
  INTEGER (0..246),
    nr-DL-PRS-Info-r16                  NR-DL-PRS-Info-r16,
    ...,
    [[
      prs-OnlyTP-r16                    ENUMERATED
{ true }  OPTIONAL -- Need ON
    ]],
    [[
      nr-DL-PRS-ExpectedAoD-or-AoA-r17
                                          NR-DL-
PRS-ExpectedAoD-or-AoA-r17   OPTIONAL -- Need ON
    ]],
  [[
    nr-DL-PRS-AggregationList-r18   SEQUENCE (SIZE
(1..nrMaxAggregationPerTRP-r18)) OF NR-DL-PRS-Aggregation-r18
OPTIONAL,
  ]]
  }
  (Method A: List of resource sets)
  Nr-DL-PRS-AggregatedSet-r18   SEQUENCE (SIZE (2..3)) OF NR-
DL-PRS-ResourceSetID-r16
(Method B: Use of BIT STRING)
  Nr-DL-PRS-AggregatedSet-r18   BIT STRING (SIZE(8)
```

8 bits may be used. When method B is used, aggregated DL-PRS resource sets may be indicated by configuring "1" as a bit at a position corresponding to an aggregated DL-PRS resource set among a maximum of 8 DL-PRS resource sets allocated for each TRP. When method A is used, 3 bits are used to indicate each DL-PRS-ResourceSetID, and thus 6-9 bits are used to indicate 2-3 aggregated DL-PRS resource sets. On the other hand, when method B is used, 8 bits are fixedly used. Therefore, in a case where the number of aggregated DL-PRS resource sets is normally expected to be 2, the signaling load may be reduced when method A is used, and in a case where the number is 3, using method B is advantageous in view of the signaling load.

In a case where DL-PRS resource set aggregation information is included in an NR-DL-PRS-AssistanceDataPerTRP-r16 IE in the unit of TRPs as in method 2, an NR-DL-PRS-AssistanceDataPerTRP-r16 IE for a particular TRP may be repeatedly transmitted for each PFL and thus aggregation information may also be repeatedly transmitted for each PFL, so that it is inefficient. In an example, when NR-DL-PRS-AssistanceDataPerTRP-r16 IE information for a particular TRP (e.g., TRP-1) is included in an NR-DL-PRS-AssistanceDataPerFreq-r16 IE for a particular PFL (e.g., PFL-1), the terminal may secure information on a DL-PRS resource set combination aggregated at the TRP (for convenience of explanation, hereinafter, the information is referred to as aggregation information). The aggregation information may include information indicating that a DL-PRS resource set (e.g., set-2) transmitted on PFL-1 and a DL-PRS resource set (e.g., set-3) transmitted on PFL-2 have been aggregated. Thereafter, DL-PRS-AssistanceDataPerTRP-r16 IE information for the TRP may also be included in an NR-DL-PRS-AssistanceDataPerFreq-r16 IE for PFL-2. Aggregation information included in the DL-PRS-AssistanceDataPerTRP-r16 IE may be repeatedly transmitted to the terminal in the NR-DL-PRS-AssistanceDataPerFreq-r16 IE for PFL-2 and thus it may be inefficient. Therefore, if aggregation information has already been transferred in an NR-DL-PRS-AssistanceDataPerFreq-r16 IE for a particular PFL, an NR-DL-PRS-AssistanceDataPerFreq-r16 IE for another PFL may not include aggregation information. To this end, sentences for preventing overlapping configuration may be included in a field description of nr-DL-PRS-AggregationList or nr-DL-PRS-AggregatedSetList as shown in Table 12.

TABLE 12

| |
|---|
| nr-DL-PRS-AggregationList/AggregatedSetList<br>This field specifies the DL-PRS resources sets linked across PFLs for BW aggregation.<br>Note, if this field is present in IE NR-DL-PRS-AssistanceDataPerTRP for a certain TRP in another PFL, it is absent for the same TRP in other PFLs. |

In Table 11, an nr-DL-PRS-AggregationList-r18 field may indicate aggregation combinations (NR-DL-PRS-Aggregation-r18 IEs) of DL-PRS resource sets transmitted by a corresponding TRP in the form of a list. Each NR-DL-PRS-AggregatedSet-r18 IE may indicate 2-3 aggregated DL-PRS resource sets. As a method for indicating an aggregated DL-PRS resource set for each aggregation combination, a method (method A) of using a list of NR-DL-PRS-ResourceSetID or a method (method B) of using a bitmap of Method 3 (including DL-PRS aggregation information in an NR-DL-PRS-ResourceSet IE): When a corresponding DL-PRS resource set in an NR-DL-PRS-ResourceSet-r16 IE is aggregated with a different DL-PRS resource set, information for indicating DL-PRS resource sets aggregated with the corresponding DL-PRS resource set may be added. In this case, one of two methods may be used as a method for representing an aggregation combination of DL-PRS resource sets.

Method 3-1 (using dl-PRS-AggregationID): An ID value may be assigned to each of aggregation combinations (i.e., aggregated DL-PRS resource set combinations) of DL-PRS resource sets transmitted by a particular TRP. In a case where an ID value is assigned to each aggregation combination, when the LMF requests the terminal to perform DL-PRS measurement for a particular aggregation combination in operation 1*h*-27 or the terminal reports a DL-PRS measurement result for a particular aggregation combination in operation 1*h*-29, the ID value may be used so as to reduce a signaling load between the LMF and the terminal. When method 3-1 is used, an NR-DL-PRS-ResourceSet-r16 IE may be configured as shown in Table 13.

TABLE 13

```
    NR-DL-PRS-ResourceSet-r16 ::= SEQUENCE {
    nr-DL-PRS-ResourceSetID-r16                    NR-DL-PRS-ResourceSetID-
r16,
    dl-PRS-Periodicity-and-ResourceSetSlotOffset-r16
                                                NR-DL-PRS-Periodicity-and-
ResourceSetSlotOffset-r16,
    dl-PRS-ResourceRepetitionFactor-r16 ENUMERATED {n2, n4, n6,
n8, n16, n32, ...}
  OPTIONAL, -- Need OP
    dl-PRS-ResourceTimeGap-r16                     ENUMERATED {s1, s2, s4, s8,
s16, s32, ...}
  OPTIONAL, -- Cond Rep
    dl-PRS-NumSymbols-r16                          ENUMERATED {n2, n4, n6,
n12, ...},
    dl-PRS-MutingOption1-r16                     DL-PRS-MutingOption1-r16
  OPTIONAL, -- Need OP
    dl-PRS-MutingOption2-r16                     DL-PRS-MutingOption2-r16
  OPTIONAL, -- Need OP
    dl-PRS-ResourcePower-r16                     INTEGER (-60..50),
    dl-PRS-ResourceList-r16                      SEQUENCE (SIZE
(1..nrMaxResourcesPerSet-r16)) OF
                                                         NR-DL-
PRS-Resource-r16,
    ...,
       [[
       dl-PRS-AggregationID-r18                        DL-PRS-AggregationID-r18
OPTIONAL
       ]]
    }
    DL-PRS-AggregationID-r18 ::= INTEGER
(0..nrMaxAggregationPerTRP-1-r18)
```

In Table 13, a dl-PRS-AggregationID-r18 field may indicate an ID value assigned to an aggregation combination of particular DL-PRS resource sets transmitted by a corresponding TRP. Therefore, if different DL-PRS resource sets transmitted by a particular TRP have the same dl-PRS-AggregationID-r18 value (i.e., NR-DL-PRS-ResourceSet-r16 IEs for different DL-PRS resource sets include the same dl-PRS-AggregationID-r18 value), this may mean that the DL-PRS resource sets have been aggregated. When dl-PRS-AggregationID is used, the signaling load may be reduced compared to directly indicating an ID value of a DL-PRS resource set aggregated with each resource set in the unit of DL-PRS resource sets, as described in method 3-2 below. For example, in a case where different DL-PRS resource set-1/set-2/set-3 transmitted by TRP-1 are aggregated, ID values of two different aggregated DL-PRS resource set are required to be repeatedly configured in an NR-DL-PRS-ResourceSet-r16 IE for each DL-PRS resource set. On the contrary, when a dl-PRS-AggregationID value is used, only one dl-PRS-AggregationID value is required to be included in an NR-DL-PRS-ResourceSet-r16 IE for each DL-PRS resource set. A DL-PRS-AggregationID value may be defined to be an integer value between 0 and an nrMaxAggregationPerTRP-1-r18 value, and the nrMaxAggregationPerTRP value means a maximum number of DL-PRS aggregation combinations allowed for each TRP. In order to support a case where a particular DL-PRS resource set is included in several DL-PRS aggregation combinations, a dl-PRS-AggregationID-r18 field may be defined in the form of indicating a list of DL-PRS-AggregationID-r18 values.

Method 3-2 (not using dl-PRS-AggregationID): An aggregation combination (i.e., aggregated DL-PRS resource set combination) of DL-PRS resource sets transmitted by a particular TRP may be indicated in the form of a list without IDs as shown in Table 14.

TABLE 14

```
    NR-DL-PRS-ResourceSet-r16 ::= SEQUENCE {
    nr-DL-PRS-ResourceSetID-r16                NR-DL-PRS-ResourceSetID-r16,
    dl-PRS-Periodicity-and-ResourceSetSlotOffset-r16
                                               NR-DL-PRS-Periodicity-and-
ResourceSetSlotOffset-r16,
    dl-PRS-ResourceRepetitionFactor-r16        ENUMERATED {n2, n4, n6, n8,
n16, n32, ...}
  OPTIONAL, -- Need OP
    dl-PRS-ResourceTimeGap-r16                 ENUMERATED {s1, s2, s4, s8, s16,
s32, ...}
  OPTIONAL, -- Cond Rep
```

TABLE 14-continued

```
        dl-PRS-NumSymbols-r16                   ENUMERATED {n2, n4, n6, n12,
...},
        dl-PRS-MutingOption1-r16                DL-PRS-MutingOption1-r16
     OPTIONAL, -- Need OP
        dl-PRS-MutingOption2-r16                DL-PRS-MutingOption2-r16
     OPTIONAL, -- Need OP
        dl-PRS-ResourcePower-r16                INTEGER (-60..50),
        dl-PRS-ResourceList-r16                 SEQUENCE        (SIZE
(1..nrMaxResourcesPerSet-r16)) OF
                                                   NR-DL-PRS-
Resource-r16,
        ...,
        [[
        nr-DL-PRS-AggregatedSetList-r18                SEQUENCE (SIZE
(1..nrMaxAggregationPerTRP-r18))      OF      NR-DL-PRS-AggregatedSet-r18
OPTIONAL,
        ]]
        }
        (Method A: List of resource sets)
          nr-DL-PRS-AggregatedSet-r18 ::= SEQUENCE (SIZE (1..2)) OF NR-
DL-PRS-ResourceSetID-r16 OPTIONAL
        (Method        B:     Use          of       BIT         STRING)
   nr-DL-PRS-AggregatedSet-r18 ::= BIT STRING (SIZE(8)) OPTIONAL
```

In Table 14, an nr-DL-PRS-AggregationList-r18 field may indicate different DL-PRS resource set combinations (NR-DL-PRS-AggregatedSet-r18 IEs) aggregated with a corresponding DL-PRS resource set in the form of a list. As a method for indicating different DL-PRS resource set combinations (NR-DL-PRS-AggregatedSet-r18 IEs) aggregated with a corresponding DL-PRS resource set, a method (method A) of using a list of NR-DL-PRS-ResourceSetID or a method (method B) of using a bitmap of 8 bits may be used. When method B is used, aggregated DL-PRS resource sets may be indicated by configuring "1" as a bit at a position corresponding to an aggregated DL-PRS resource set among a maximum of 8 DL-PRS resource sets allocated for each TRP. When method A is used, 3 bits are used to indicate each DL-PRS-ResourceSetID, and thus 3-6 bits are used to indicate 1 or 2 aggregated DL-PRS resource sets. On the other hand, when method B is used, 8 bits are fixedly used. Therefore, using B may be advantageous compared to method A in view of the signaling load.

The LMF may indicate, to the terminal, that particular DL-PRS resource sets have been aggregated by one method among method 1, method 2, and method 3 described above. Multiple DL-PRS resources may be included in each DL-PRS resource set indicated as having been aggregated. An aggregation relation between several DL-PRS resources belonging to aggregated DL-PRS resource sets may be implicitly indicated. More specifically, DL-PRS resources belonging to an aggregated DL-PRS resource set may be assumed as having been aggregated if a DL-PRS aggregation condition described with reference to FIG. 1G is satisfied.

In operation 1*h*-27, the LMF may transmit an LPP RequestLocationInformation message to the terminal, thereby requesting signal measurement required for location estimation and a location estimation result. Pieces of information included in the LPP RequestLocationInformation message are the same as described in the part 1*e*-25 of FIG. 1E.

When the LMF is to use DL-PRS BW aggregation for location estimation of the terminal, the LMF may indicate the terminal to perform an aggregated measurement operation at the time of DL-PRS measurement. For reference, the aggregated measurement operation may mean an operation of, when different DL-PRS resources transmitted on different PFLs are aggregated, recognizing the aggregated DL-PRS resources as one DL-PRS and performing DL-PRS detection and measurement of a reception time point. The LMF may indicate the aggregated measurement operation to the terminal through an LPP RequestLocationInformation message by using at least one method among the following methods.

Method 0 (No explicit indication): The LMF may indicate performing of aggregated measurement through NR-DL-PRS-AssistanceData in LPP ProvideAssistanceData transmitted to the terminal in operation 1*h*-25, without a separate explicit indication. More specifically, the LMF may indicate, to the terminal, that some of DL-PRS resources included in NR-DL-PRS-AssistanceData have been aggregated, in the same method as described in operation 1*h*-25. If an aggregated DL-PRS resource set combination exists in NR-DL-PRS-AssistanceData, the terminal may interpret same as an implicit indication to perform aggregated measurement. In this case, the terminal may perform aggregated measurement even when there is no separate explicit indication in the LPP RequestLocationInformation message.

Method 1 (1-bit indication to request the aggregated measurement): The LMF may indicate the terminal to perform aggregated measurement if possible through a 1-bit indicator. When the terminal receives, from the base station, an indication to perform aggregated measurement through a 1-bit indicator, the terminal may perform aggregated measurement by using some or all of aggregated DL-PRS resource sets included in DL-PRS configuration information (NR-DL-PRS-AssistanceData) received in operation 1*h*-25. As a 1-bit indicator, a new indicator may be defined (method A), or an existing indicator (nr-RequestedMeasurements-r16) may be recycled (method B). Specifically, a 1-bit indicator may be defined in NR-DL-TDOA-RequestedLocationInformation-r16 or NR-Multi-RTT-RequestedLocationInformation-r16 included in an LPP RequestLocationInformation message as shown in Table 15.

TABLE 15

```
NR-DL-TDOA-RequestLocationInformation-r16 ::= SEQUENCE {
    nr-DL-PRS-RstdMeasurementInfoRequest-r16 ENUMERATED
{ true }                                          OPTIONAL, -- Need ON
  (Method B: Recycling nr-RequestedMeasurements-r16)         BIT
    nr-RequestedMeasurements-r16
STRING { prsrsrpReq (0),
                                                  firstPathRsrpReq-r17 (1),
aggregatedMeasurement (2),
                                                  } (SIZE(1..8)),
    nr-AssistanceAvailability-r16
  BOOLEAN,
    nr-DL-TDOA-ReportConfig-r16
  NR-DL-TDOA-ReportConfig-r16                       OPTIONAL, -- Need ON
    additionalPaths-r16
  ENUMERATED { requested }                          OPTIONAL, -- Need ON
    ...,
    [[
    nr-UE-RxTEG-Request-r17
  ENUMERATED { requested }                          OPTIONAL, -- Need ON
    nr-los-nlos-IndicatorRequest-r17                SEQUENCE {
  type-r17                                        LOS-NLOS-IndicatorType1-r17,
  granularity-r17                                 LOS-NLOS-IndicatorGranularity1-r17,
  ...
                                                    }
  OPTIONAL, -- Need ON
    additionalPathsExt-r17
  ENUMERATED { requested }                          OPTIONAL, -- Need ON
    additionalPathsDL-PRS-RSRP-Request-r17
  ENUMERATED { requested }                          OPTIONAL, -- Need ON
    multiMeasInSameReport-r17
  ENUMERATED { requested }                          OPTIONAL -- Need ON
    ]],
  (Method A: Defining a new indicator)
   [[
  aggregatedMeasurementRequest-r18                    ENUMERATED
{ requested } OPTIONAL
  ]]
  }
```

If a new indicator aggregatedMeasurementRequest-r18 is defined as in method A in Table 15, the LMF may configure the corresponding indicator to be "requested" and include same in an LPP RequestLocationInformation message to indicate aggregated measurement to the terminal. If an existing indicator nr-RequestedMeasurements-r16 is recycled as in method B, the LMF may configure the third bit of a bit string included in nr-RequestedMeasurements-r16 to be "1" to indicate aggregated measurement to the terminal.

Method 2 (Indication of dl-PRS-AggregationID to use for the aggregated measurement): When the LMF provides information on an aggregated DL-PRS resource set to the terminal by using dl-PRS-AggregationID in operation **1*h*-25**, the LMF may indicate aggregated measurement to the terminal by including a particular dl-PRS-AggregationID in an LPP RequestLocationInformation message. When a particular dl-PRS-AggregationID value is configured in an LPP RequestLocationInformation message received from the LMF, the terminal may perform aggregated measurement by using an aggregated DL-PRS resource set combination connected to the dl-PRS-AggregationID value. Specifically, a new indicator (requestedDL-PRS-AggregationID-r18) for indicating a particular dl-PRS-AggregationID may be defined in NR-DL-TDOA-RequestedLocationInformation-r16 or NR-Multi-RTT-RequestedLocationInformation-r16 included in an LPP RequestLocationInformation message as shown in Table 16.

TABLE 16

```
  NR-DL-TDOA-RequestLocationInformation-r16 ::= SEQUENCE {
    nr-DL-PRS-RstdMeasurementInfoRequest-r16 ENUMERATED
{ true }                                  OPTIONAL,-- Need ON
    nr-RequestedMeasurements-r16                  BIT STRING
{ prsrsrpReq (0),
                                        firstPathRsrpReq-r17 (1)
                                        } (SIZE(1..8)),
    nr-AssistanceAvailability-r16                 BOOLEAN,
    nr-DL-TDOA-ReportConfig-r16                     NR-DL-
TDOA-ReportConfig-r16                     OPTIONAL, -- Need ON
    additionalPaths-r16
  ENUMERATED { requested }                  OPTIONAL, -- Need ON
    ...,
    [[
    nr-UE-RxTEG-Request-r17
```

TABLE 16-continued

```
  ENUMERATED { requested }              OPTIONAL, -- Need ON
    nr-los-nlos-IndicatorRequest-r17    SEQUENCE {
  type-r17                            LOS-NLOS-IndicatorType1-r17,
  granularity-r17                   LOS-NLOS-IndicatorGranularity1-r17,
  ...
                                              }
                                                OPTIONAL, -- Need
ON
    additionalPathsExt-r17
  ENUMERATED { requested }              OPTIONAL, -- Need ON
    additionalPathsDL-PRS-RSRP-Request-r17
  ENUMERATED { requested }              OPTIONAL, -- Need ON
    multiMeasInSameReport-r17
  ENUMERATED { requested }              OPTIONAL -- Need ON
    ]],
  [[
  aggregatedMeasurementRequest-r18         ENUMERATED { requested }
OPTIONAL,
  requestedDL-PRS-AggregationID-r18          DL-PRS-AggregationID-r18
OPTIONAL, -- Cond AggregatedMeas
  ]]
  }
```

A new indicator (requestedDL-PRS-AggregationID-r18) for indicating dl-PRS-AggregationID may be used together with a 1-bit indicator (aggregatedMeasurementRequest-r18) described in method 1. In this case, a conditional presence code (e.g., AggregatedMeas) enabling requestedDL-PRS-AggregationID-r18 to be selectively included only when aggregatedMeasurementRequest-r18 is configured to be "requested" may be defined as shown in Table 17.

TABLE 17

| Conditional presence | Explanation |
|---|---|
| AggregatedMeas | The field is optionally present, need ON, if aggregatedMeasurementRequest-r18 is present(set); otherwise it is absent. |

Method 3 (Indication of which PFLs to use for the aggregated measurement): The LMF may indicate aggregated measurement to the terminal by configuring PFLs to be used for the aggregated measurement in an LPP RequestLocationInformation message. When PFLs to be used for aggregated measurement are indicated in an LPP RequestLocationInformation message received from the LMF, the terminal may perform aggregated measurement by using a proper combination (e.g., an aggregated DL-PRS resource set combination exhibiting good signal strength) of aggregated DL-PRS resource sets on the indicated PFLs among aggregated DL-PRS resource sets included in DL-PRS configuration information (NR-DL-PRS-AssistanceData) received in operation **1*h*-25**. For reference, method 3 of indicating only PFLs may give bigger freedom to the terminal to determine which aggregated DL-PRS resource set combination to be used for aggregated measurement, compared to method 2 of explicitly indicating a DL-PRS resource set combination to be subject to aggregated measurement. Specifically, a new indicator (aggregatedMeasurementRequestedPFLs-r18) for indicating particular PFLs may be defined in NR-DL-TDOA-RequestedLocationInformation-r16 or NR-Multi-RTT-RequestedLocationInformation-r16 included in an LPP RequestLocationInformation message as shown in Table 18.

TABLE 18

```
  NR-DL-TDOA-RequestLocationInformation-r16 ::= SEQUENCE {
    nr-DL-PRS-RstdMeasurementInfoRequest-r16 ENUMERATED
{ true }                                      OPTIONAL, -- Need ON
    nr-RequestedMeasurements-r16                          BIT STRING
{ prsrsrpReq (0),
                                            firstPathRsrpReq-r17 (1)
      } (SIZE(1..8)),
    nr-AssistanceAvailability-r16                         BOOLEAN,
    nr-DL-TDOA-ReportConfig-r16                            NR-DL-
TDOA-ReportConfig-r16                         OPTIONAL, -- Need ON
    additionalPaths-r16
  ENUMERATED { requested }                      OPTIONAL, -- Need ON
    ...,
    [[
    nr-UE-RxTEG-Request-r17
  ENUMERATED { requested }                      OPTIONAL, -- Need ON
    nr-los-nlos-IndicatorRequest-r17            SEQUENCE {
  type-r17                                    LOS-NLOS-IndicatorType1-r17,
  granularity-r17                           LOS-NLOS-IndicatorGranularity1-r17,
  ...
                                                      }
                                                    OPTIONAL, -- Need
ON
```

TABLE 18-continued

```
    additionalPathsExt-r17
  ENUMERATED { requested }                    OPTIONAL, -- Need ON
    additionalPathsDL-PRS-RSRP-Request-r17
  ENUMERATED { requested }                    OPTIONAL, -- Need ON
    multiMeasInSameReport-r17
  ENUMERATED { requested }                    OPTIONAL -- Need ON
    ]] ,
  [[
  aggregatedMeasurementRequest-r18              ENUMERATED { requested }
OPTIONAL,
(Method A: Using BIT MAP)
  aggregatedMeasurementRequestedPFLs-r18          BIT STRING (SIZE(4)
OPTIONAL, -- Cond AggregatedMeas
  (Method B: Using a PFL index list)
  aggregatedMeasurementRequestedPFLs-r18          SEQUENCE (SIZE (2..3))
OF NR-AggregatedDL-PRS-FrequencyLayerIndex          OPTIONAL, -- Cond
AggregatedMeas
  ]]
  }
```

If a new indicator is defined in a method (method A) of using a bitmap as in Table 18, each bit of a bit string configuring a bitmap may correspond to a particular PFL. DL-PRS configuration information on a maximum of 4 PFLs may be included in NR-DL-PRS-AssistanceData provided to the terminal by the LMF in operation 1*h*-25. Therefore, a new indicator aggregatedMeasurementRequestedPFLs-r18 may be defined to be a bit string of 4 bits long, and respective bits in the bit string sequentially indicate PFLs corresponding to NR-DL-PRS-AssistanceData-PerFreq-r16 included in NR-DL-PRS-AssistanceDataPerList existing in NR-DL-PRS-AssistanceData received by the terminal in operation 1*h*-25. For example, when NR-DL-PRS-AssistanceDataPerFreq-r16 IEs for PFL-1, PFL-2, PFL-3, and PFL-4 are sequentially included in NR-DL-PRS-AssistanceDataPerList in NR-DL-PRS-AssistanceData received by the terminal in operation 1*h*-25, the LMF may indicate the terminal to use PFL-1, PFL-3, and PFL-4 to perform aggregated measurement by configuring a bit string value of an aggregatedMeasurementRequestedPFLs-r18 indicator to be "1011". As shown in Table 18, if a new indicator is defined in a method (method B) of using a PFL index list, the new indicator may indicate 2 or 3 PFL index values in the form of a list. If the LMF indicates index values of 2 or 3 PFLs through aggregatedMeasurementRequestedPFLs-r18, the terminal may perform aggregated measurement by using DL-PRS resource sets aggregated on the indicated PFLs among aggregated DL-PRS resource sets included in DL-PRS configuration information (NR-DL-PRS-AssistanceData) received in operation 1*h*-25. A PFL index value occupies 2 bits, and thus 4-6 bits may be consumed to indicate 2 or 3 PFLs in the same PFL index list method as method B. On the contrary, if PFLs are indicated in the same bitmap method as method A, 4 bits are consumed and thus method A is advantageous compared to method B in view of the signaling load.

Additionally, a new indicator (aggregatedMeasurementRequestedPFLs-r18) for indicating PFLs to be used for aggregated measurement may be used together with a 1-bit indicator (aggregatedMeasurementRequest-r18) described in method 1. A conditional presence code (e.g., AggregatedMeas) enabling aggregatedMeasurementRequestedPFLs-r18 to be selectively included only when aggregatedMeasurementRequest-r18 is configured to be "requested" may be defined as shown in Table 19.

TABLE 19

| Conditional presence | Explanation |
|---|---|
| AggregatedMeas | The field is optionally present, need ON, if aggregatedMeasurementRequest-r18 is present(set); otherwise it is absent. |

In operation 1*h*-29, the terminal may transfer a location signal measurement result and a location estimation result requested from the LMF in operation 1*h*-27 to the LMF through an LPP ProvideLocationInformation message. Specific pieces of information included in the LPP ProvideLocationInformation message are the same as described in the part 1*e*-30 of FIG. 1E.

When the LMF explicitly or implicitly indicates aggregated measurement for a DL-PRS BW aggregation operation to the terminal in operation 1*h*-27, the terminal may perform aggregated measurement and then include a result value thereof (a location estimation result and a location estimation signal measurement result value) in an LPP ProvideLocationInformation message. In order to notify the LMF that the measurement result included in the LPP ProvideLocationInformation message is a result obtained by performing aggregated measurement, at least one of the following two methods may be used.

Method 1 (using a 1-bit indicator): The terminal may notify, by using a 1-bit indicator, the LMF that a measurement result value (location estimation signal measurement result) in an NR-DL-TDOA-MeasElement-r16 IE and NR-MULTI-RTT-MeasElement-r16 IE included in an LPP ProvideLocationInformation message is a result value obtained by performing aggregated measurement. The 1-bit indicator may be defined in an NR-DL-TDOA-MeasElement-r16 IE and NR-MULTI-RTT-MeasElement-r16 IE as shown in Table 20. Additionally, when the terminal reports a location estimation result, the 1-bit indicator may be defined in a CommonIEsProvideLocationInformation IE included in an LPP ProvideLocationInformation message.

Method 2 (expanding an existing field): The terminal may expand an existing field (an nr-RSTD-r16 field in an NR-DL-TDOA-MeasElement-r16 IE and an nr-UE-RxTxTimeDiff field in an NR-MULTI-RTT-MeasElement-r16 IE) for reporting a DL-PRS measurement result value (location estimation signal measurement result value) to notify the LMF that the measurement result value (location estimation signal measurement result) is a result of performing aggregated measurement. An nr-RSTD-r16 field and an nr-UE-RxTxTimeDiff field may be expanded in an NR-DL-TDOA-MeasElement-r16 IE and an NR-MULTI-RTT-MeasElement-r16 IE as shown in Table 20, respectively.

TABLE 20

```
NR-DL-TDOA-MeasElement-r16 ::= SEQUENCE {
    dl-PRS-ID-r16                                   INTEGER
(0..255),
    nr-PhysCellID-r16                               NR-PhysCellID-r16
                                                  OPTIONAL,
    nr-CellGlobalID-r16                             NCGI-r15
                                                    OPTIONAL,
    nr-ARFCN-r16                                    ARFCN-
ValueNR-r15                                         OPTIONAL,
    nr-DL-PRS-ResourceID-r16                        NR-DL-PRS-
ResourceID-r16                                      OPTIONAL,
    nr-DL-PRS-ResourceSetID-r16                     NR-DL-PRS-
ResourceSetID-r16                                   OPTIONAL,
    nr-TimeStamp-r16                                NR-TimeStamp-r16,
(Method 2: expanding an existing field)
    nr-RSTD-r16                                     CHOICE {
        k0-r16
  INTEGER (0..1970049),
        k1-r16
  INTEGER (0..985025),
        k2-r16
  INTEGER (0..492513),
        k3-r16
  INTEGER (0..246257),
        k4-r16
  INTEGER (0..123129),
        k5-r16
  INTEGER (0..61565),
        ...
  k0-aggregated-r18                     INTEGER (0..1970049),
  k1-aggregated-r18                     INTEGER (0..985025),
  k2-aggregated-r18                     INTEGER (0..492513),
  k3-aggregated-r18                         INTEGER (0..246257),
  k4-aggregated-r18                         INTEGER (0..123129),
  k5-aggregated-r18                         INTEGER (0..61565),
  kY-aggregated-r18                     INTEGER (0..XXXXXX),
  kZ-aggregated-r18                     INTEGER (0..YYYYYYY),
  ...
    },
    nr-AdditionalPathList-r16                       NR-AdditionalPathList-r16
                                        OPTIONAL,
    nr-TimingQuality-r16                            NR-TimingQuality-r16,
    nr-DL-PRS-RSRP-Result-r16                       INTEGER (0..126)
                                                  OPTIONAL,
    nr-DL-TDOA-AdditionalMeasurements-r16
                                                    NR-DL-
TDOA-AdditionalMeasurements-r16                     OPTIONAL,
    ...,
    [[
    nr-UE-Rx-TEG-ID-r17
  INTEGER (0..maxNumOfRxTEGs-1-r17)
  OPTIONAL,
    nr-DL-PRS-FirstPathRSRP-Result-r17              INTEGER (0..126)
                                                OPTIONAL,
    nr-los-nlos-Indicator-r17                       CHOICE {
        perTRP-r17
  LOS-NLOS-Indicator-r17,
        perResource-r17
  LOS-NLOS-Indicator-r17
    }
  OPTIONAL,
    nr-AdditionalPathListExt-r17                    NR-
AdditionalPathListExt-r17                         OPTIONAL,
    nr-DL-TDOA-AdditionalMeasurementsExt-r17
  NR-DL-TDOA-AdditionalMeasurementsExt-r17          OPTIONAL
    ]],
  (Method 1: Defining a 1-bit indicator)
   [[
    Nr-DL-PRS-AggregatedMeas-r18                   ENUMERATED { true }
OPTIONAL
   ]]
  }
  NR-Multi-RTT-MeasElement-r16 ::= SEQUENCE {
  dl-PRS-ID-r16                                INTEGER (0..255),
  nr-PhysCellID-r16                            NR-PhysCellID-r16
    OPTIONAL,
  nr-CellGlobalID-r16                          NCGI-r15
```

TABLE 20-continued

```
    OPTIONAL,
    nr-ARFCN-r16                                    ARFCN-ValueNR-r15
            OPTIONAL,
    nr-DL-PRS-ResourceID-r16                        NR-DL-PRS-ResourceID-r16
            OPTIONAL,
    nr-DL-PRS-ResourceSetID-r16                         NR-DL-PRS-ResourceSetID-r16
              OPTIONAL,
    (Method 2: expanding an existing field)
    nr-UE-RxTxTimeDiff-r16                              CHOICE {
            k0-r16                                  INTEGER (0..1970049),
            k1-r16                                  INTEGER (0..985025),
            k2-r16                                  INTEGER (0..492513),
            k3-r16                                  INTEGER (0..246257),
            k4-r16                                  INTEGER (0..123129),
            k5-r16                                  INTEGER (0..61565),
            ...
    k0-aggregated-r18                         INTEGER (0..1970049),
    k1-aggregated-r18                         INTEGER (0..985025),
    k2-aggregated-r18                         INTEGER (0..492513),
    k3-aggregated-r18                                 INTEGER (0..246257),
    k4-aggregated-r18                                 INTEGER (0..123129),
    k5-aggregated-r18                                 INTEGER (0..61565),
    kY-aggregated-r18                         INTEGER (0..XXXXXX),
    kZ-aggregated-r18                         INTEGER (0..YYYYYYY),
    ...
    },
    nr-AdditionalPathList-r16                       NR-AdditionalPathList-r16
        OPTIONAL,
    nr-TimeStamp-r16                                NR-TimeStamp-r16,
    nr-TimingQuality-r16                          NR-TimingQuality-r16,
    nr-DL-PRS-RSRP-Result-r16                           INTEGER (0..126)
            OPTIONAL,
    nr-Multi-RTT-AdditionalMeasurements-r16
                                                  NR-Multi-RTT-AdditionalMeasurements-
r16 OPTIONAL,
    ...,
    [[
    nr-UE-RxTx-TEG-Info-r17                               NR-UE-RxTx-TEG-Info-r17
              OPTIONAL,
    nr-DL-PRS-FirstPathRSRP-Result-r17                    INTEGER (0..126)
            OPTIONAL,
    nr-los-nlos-Indicator-r17                       CHOICE {
              perTRP-r17                                  LOS-NLOS-Indicator-r17,
              perResource-r17                             LOS-NLOS-Indicator-r17
    }
  OPTIONAL,
    nr-AdditionalPathListExt-r17                        NR-AdditionalPathListExt-r17
        OPTIONAL,
    nr-Multi-RTT-AdditionalMeasurementsExt-r17
                                                    NR-Multi-RTT-
AdditionalMeasurementsExt-r17OPTIONAL
    ]],
    (Method 1: Defining a 1-bit indicator)
      [[
        Nr-DL-PRS-AggregatedMeas-r18                        ENUMERATED { true }
OPTIONAL
      ]]
    }
```

If a 1-bit indicator (Nr-DL-PRS-AggregatedMeas-r18) is newly defined and used as shown in Table 20 (method 1), the terminal may configure a 1-bit indicator to notify the LMF that measurement result values (e.g., nr-RSTD-r16 field and nr-UE-RxTxTimeDiff field) included in an NR-DL-TDOA-MeasElement-r16 IE and NR-MULTI-RTT-MeasElement-r16 IE are results obtained by performing aggregated measurement. If an existing field (nr-RSTD-r16 field and nr-UE-RxTxTimeDiff) is expanded as shown in Table 20 (method 2), the terminal may use expanded variable values (kx-aggregated-r18) in the field to indicate that a corresponding result value is a result obtained by performing aggregated measurement. The reason why one is selected from among multiple kx-r16 and kx-aggregated-r18 variables in an nr-RSTD-r16 field and an nr-UE-RxTxTimeDiff field in a CHOICE type to report a result value is to report the result value with various granularities. In a case where the terminal performs aggregated measurement for an aggregated DL-PRS resource, the terminal may measure a DL-PRS reception time point with higher resolution (i.e., smaller granularity) as described with reference to FIG. 1G. Therefore, if aggregated measurement is performed, variables for reporting a measurement value with granularity smaller (resolution higher) than a previously defined kx-r16 value, such as kY-aggregated-r18 or kZ-aggregated-r18, may be newly defined.

If the terminal performs aggregated measurement, the terminal may more specifically report, to the LMF, a DL-PRS resource set combination and pieces of PFL information used for aggregated measurement. To this end, at least one combination among the following pieces of information may be newly defined in an NR-DL-TDOA-MeasElement-r16 IE and NR-MULTI-RTT-MeasElement-r16 IE included in an LPP ProvideLocationInformation message. The name of information (or parameter, indicator, field, etc.) described in the disclosure is not limited to the name mentioned in the disclosure, and may be expressed by a different name, based on the characteristics or nature of the information (or parameter, indicator, field, etc.). Alternatively, information may be expressed by first information (or parameter, indicator, field, etc.) or second information.

DL-PRS-AggregationID (information 1): When the LMF provides, to the terminal, information on an aggregated DL-PRS resource set by using dl-PRS-AggregationID in operation 1*h*-25, the terminal may include a particular dl-PRS-AggregationID in an NR-DL-TDOA-MeasElement-r16 IE and NR-MULTI-RTT-MeasElement-r16 IE included in an LPP ProvideLocationInformation message. The terminal may use a dl-PRS-AggregationID value to report, to the LMF, which aggregated DL-PRS resource set combination has been used to perform aggregated measurement to obtain a result value included in the NR-DL-TDOA-MeasElement-r16 IE and NR-MULTI-RTT-MeasElement-r16 IE.

List of NR-DL-PRS-ResourceSetIDs (information 2): When the LMF provides, to the terminal, information on an aggregated DL-PRS resource set without using dl-PRS-AggregationID in operation 1*h*-25, the terminal may include, in the form of a list, IDs of DL-PRS resource sets having been used for aggregated measurement in an NR-DL-TDOA-MeasElement-r16 IE and NR-MULTI-RTT-MeasElement-r16 IE included in an LPP ProvideLocation-Information message. The terminal may use a DL-PRS resource set ID list to report, to the LMF, which aggregated DL-PRS resource set combination has been used to perform aggregated measurement to obtain a result value included in the NR-DL-TDOA-MeasElement-r16 IE and NR-MULTI-RTT-MeasElement-r16 IE. For reference, the disclosure includes only an embodiment of including IDs of DL-PRS resource sets for convenience of explanation. However, a DL-PRS resource ID list may also be included together to indicate DL-PRS resources having been used for aggregated measurement in the unit of DL-PRS resources.

Used PFLs (information 3): The terminal may include PFLs having been used for aggregated measurement in an NR-DL-TDOA-MeasElement-r16 IE and NR-MULTI-RTT-MeasElement-r16 IE included in an LPP ProvideLocation-Information message in the form of a bit string (method A) or a PFL index list (method B). The terminal may use a bit string or a PFL index list to report, to the LMF, which PFLs on which aggregated measurement has been performed to obtain a result value included in the NR-DL-TDOA-MeasElement-r16 IE and NR-MULTI-RTT-MeasElement-r16 IE.

The described pieces of information may be defined in an NR-DL-TDOA-MeasElement-r16 IE and NR-MULTI-RTT-MeasElement-r16 IE as shown in Table 21.

TABLE 21

```
NR-DL-TDOA-MeasElement-r16 ::= SEQUENCE {
        dl-PRS-ID-r16                                   INTEGER
(0..255),
        nr-PhysCellID-r16                               NR-PhysCellID-r16
                                                        OPTIONAL,
        nr-CellGlobalID-r16                             NCGI-r15
                                                        OPTIONAL,
        nr-ARFCN-r16                                    ARFCN-
ValueNR-r15                                             OPTIONAL,
        nr-DL-PRS-ResourceID-r16                        NR-DL-PRS-
ResourceID-r16                                          OPTIONAL,
        nr-DL-PRS-ResourceSetID-r16                     NR-DL-PRS-
ResourceSetID-r16                                       OPTIONAL,
        nr-TimeStamp-r16                                NR-TimeStamp-r16,
    nr-RSTD-r16                                         CHOICE {
            k0-r16
    INTEGER (0..1970049),
            k1-r16
    INTEGER (0..985025),
            k2-r16
    INTEGER (0..492513),
            k3-r16
    INTEGER (0..246257),
            k4-r16
    INTEGER (0..123129),
            k5-r16
    INTEGER (0..61565),
            ...
        },
        nr-AdditionalPathList-r16                       NR-AdditionalPathList-r16
            OPTIONAL,
        nr-TimingQuality-r16                            NR-TimingQuality-r16,
        nr-DL-PRS-RSRP-Result-r16                       INTEGER (0..126)
                                                        OPTIONAL,
        nr-DL-TDOA-AdditionalMeasurements-r16
                                                        NR-DL-
TDOA-AdditionalMeasurements-r16                         OPTIONAL,
        ...,
        [[
        nr-UE-Rx-TEG-ID-r17
    INTEGER (0..maxNumOfRxTEGs-1-r17)
    OPTIONAL,
        nr-DL-PRS-FirstPathRSRP-Result-r17              INTEGER (0..126)
                                                        OPTIONAL,
```

TABLE 21-continued

```
            nr-los-nlos-Indicator-r17                                   CHOICE {
                        perTRP-r17
    LOS-NLOS-Indicator-r17,
                        perResource-r17
    LOS-NLOS-Indicator-r17
            }
    OPTIONAL,
            nr-AdditionalPathListExt-r17                                NR-
AdditionalPathListExt-r17                                           OPTIONAL,
            nr-DL-TDOA-AdditionalMeasurementsExt-r17
    NR-DL-TDOA-AdditionalMeasurementsExt-r17                             OPTIONAL
            ]],
    [[
        Nr-DL-PRS-AggregatedMeas-r18                                ENUMERATED { true }
OPTIONAL
    (Information 1: DL-PRS-AggregationID)
    dl-PRS-AggregationID-r18                               DL-PRS-AggregationID-r18
OPTIONAL, -- Cond AggregatedMeas
    (Information 2: List of NR-DL-PRS-ResourceSetIDs)
    nr-DL-PRS-AggregatedSet-r18                                NR-DL-PRS-AggregatedSet-r18
OPTIONAL, -- Cond AggregatedMeas
    (Information 3: Used PFLs)
    (Method A) aggregatedMeasurementPFLs-r18                        BIT STRING (SIZE(4))
OPTIONAL, -- Cond AggregatedMeas
    (Method B) aggregatedMeasurementPFLs-r18                            SEQUENCE (SIZE
(2..3)) OF NR-AggregatedDL-PRS-FrequencyLayerIndex                            OPTIONAL, -
- Cond AggregatedMeas
        ]]
    }
    NR-Multi-RTT-MeasElement-r16 ::= SEQUENCE {
    dl-PRS-ID-r16                                          INTEGER (0..255),
    nr-PhysCellID-r16                                      NR-PhysCellID-r16
        OPTIONAL,
    nr-CellGlobalID-r16                                    NCGI-r15
    OPTIONAL,
    nr-ARFCN-r16                                           ARFCN-ValueNR-r15
            OPTIONAL,
    nr-DL-PRS-ResourceID-r16                               NR-DL-PRS-ResourceID-r16
            OPTIONAL,
    nr-DL-PRS-ResourceSetID-r16                                NR-DL-PRS-ResourceSetID-r16
              OPTIONAL,
    nr-UE-RxTxTimeDiff-r16                                     CHOICE {
            k0-r16                                         INTEGER (0..1970049),
            k1-r16                                         INTEGER (0..985025),
            k2-r16                                         INTEGER (0..492513),
            k3-r16                                         INTEGER (0..246257),
            k4-r16                                         INTEGER (0..123129),
            k5-r16                                         INTEGER (0..61565),
            ...
    },
    nr-AdditionalPathList-r16                              NR-AdditionalPathList-r16
        OPTIONAL,
    nr-TimeStamp-r16                                       NR-TimeStamp-r16,
    nr-TimingQuality-r16                               NR-TimingQuality-r16,
    nr-DL-PRS-RSRP-Result-r16                                  INTEGER (0..126)
            OPTIONAL,
    nr-Multi-RTT-AdditionalMeasurements-r16
                                                     NR-Multi-RTT-AdditionalMeasurements-
r16 OPTIONAL,
    ...,
    [[
    nr-UE-RxTx-TEG-Info-r17                                    NR-UE-RxTx-TEG-Info-r17
              OPTIONAL,
    nr-DL-PRS-FirstPathRSRP-Result-r17                         INTEGER (0..126)
        OPTIONAL,
    nr-los-nlos-Indicator-r17                              CHOICE {
              perTRP-r17                                       LOS-NLOS-Indicator-r17,
              perResource-r17                                  LOS-NLOS-Indicator-r17
    }
  OPTIONAL,
    nr-AdditionalPathListExt-r17                               NR-AdditionalPathListExt-r17
        OPTIONAL,
    nr-Multi-RTT-AdditionalMeasurementsExt-r17
                                                           NR-Multi-RTT-
AdditionalMeasurementsExt-r17OPTIONAL
    ]],
    [[
        Nr-DL-PRS-AggregatedMeas-r18                                ENUMERATED { true }
OPTIONAL
    (Information 1: DL-PRS-AggregationID)
```

TABLE 21-continued

```
    dl-PRS-AggregationID-r18                          DL-PRS-AggregationID-r18
OPTIONAL, -- Cond AggregatedMeas
    (Information 2: List of NR-DL-PRS-ResourceSetIDs)
    nr-DL-PRS-AggregatedSet-r18                       NR-DL-PRS-AggregatedSet-r18
OPTIONAL, -- Cond AggregatedMeas
    (Information 3: Used PFLs)
    (Method A) aggregatedMeasurementPFLs-r18                BIT STRING (SIZE(4))
OPTIONAL, -- Cond AggregatedMeas
    (Method B) aggregatedMeasurementPFLs-r18                  SEQUENCE (SIZE
(2..3)) OF NR-AggregatedDL-PRS-FrequencyLayerIndex                  OPTIONAL, -
- Cond AggregatedMeas
    ]]
    }
```

In a case where a 1-bit indicator (Nr-DL-PRS-AggregatedMeas-r18) for indicating whether aggregated measurement is performed as defined in method 1 above is used together with information 1, information 2, and information 3, the pieces of information may be selectively included together only when an Nr-DL-PRS-AggregatedMeas-r18 indicator is configured (or included). To this end, a conditional presence code for dl-PRS-AggregationID-r18, nr-DL-PRS-AggregatedSet-r18, and aggregatedMeasurementPFLs-r18 fields may be defined as shown in Table 22.

TABLE 22

| Conditional presence | Explanation |
|---|---|
| AggregatedMeas | The field is optionally present, need ON, if aggregatedMeasurementRequest-r18 is present(set); otherwise it is absent. |

In addition, an indicator (e.g., nr-DL-PRS-RstdAggregatedMeasurementInfoRequest and nr-UE-RxTxTimeDiffAggregatedMeasurementInfoRequest) for indicating the terminal to include additional information, such as dl-PRS-AggregationID-r18, nr-DL-PRS-AggregatedSet-r18, and aggregatedMeasurementPFLs-r18, in an LPP ProvideLocationInformation message may be defined and included in an LPP RequestLocationInformation message of operation 1*h*-27. The LMF may include an indicator (e.g., nr-DL-PRS-RstdAggregatedMeasurementInfoRequest and nr-UE-RxTxTimeDiffAggregatedMeasurementInfoRequest) in an LPP RequestLocationInformation message, thereby indicating (requesting) the terminal to include aggregated measurement-related additional information (dl-PRS-AggregationID-r18, nr-DL-PRS-AggregatedSet-r18, and aggregatedMeasurementPFLs-r18) in an LPP ProvideLocationInformation message.

Additionally, a previously defined nr-DL-PRS-ResourceID-r16 and nr-DL-PRS-ResourceSetID-r16 field in Table 21 may also be used to indicate a DL-PRS Resource combination or DL-PRS-Resource Set combination having been used for aggregated measurement. In this case, the terminal may include an nr-DL-PRS-ResourceID-r16 and nr-DL-PRS-ResourceSetID-r16 value together with an aggregated measurement indicator (e.g., Nr-DL-PRS-AggregatedMeas-r18) in an LPP ProvideLocationInformation message. The LFM may identify that the terminal has performed aggregated measurement, through the aggregated measurement indicator, and additionally identify a DL-PRS resource set and a DL-PRS resource having been used for the aggregated measurement. It is possible to know which DL-PRS resource set and which DL-PRS resources with which a particular DL-PRS resource set and a particular DL-PRS resource have been aggregated, through NR-DL-PRS configuration information provided by the base station to the terminal in operation 1*h*-25. Therefore, even if the terminal provides only a particular DL-PRS resource set and a particular DL-PRS resource ID belonging to an aggregated DL-PRS resource (set) combination without providing all information on the combination, the LMF may infer a DL-PRS resource (set) having been used for aggregated measurement.

The expression “aggregated measurement” used in the description for the embodiments of FIGS. 1F, 1G, 1H, and 1I may be replaced with the expression “joint measurement”, and the expressions “DL-PRS aggregation” and “Aggregated DL-PRS” may be replaced with “DL-PRS linking” and “Linked DL-PRS”, respectively. The expressions may have essentially the same meaning.

Figure 2:
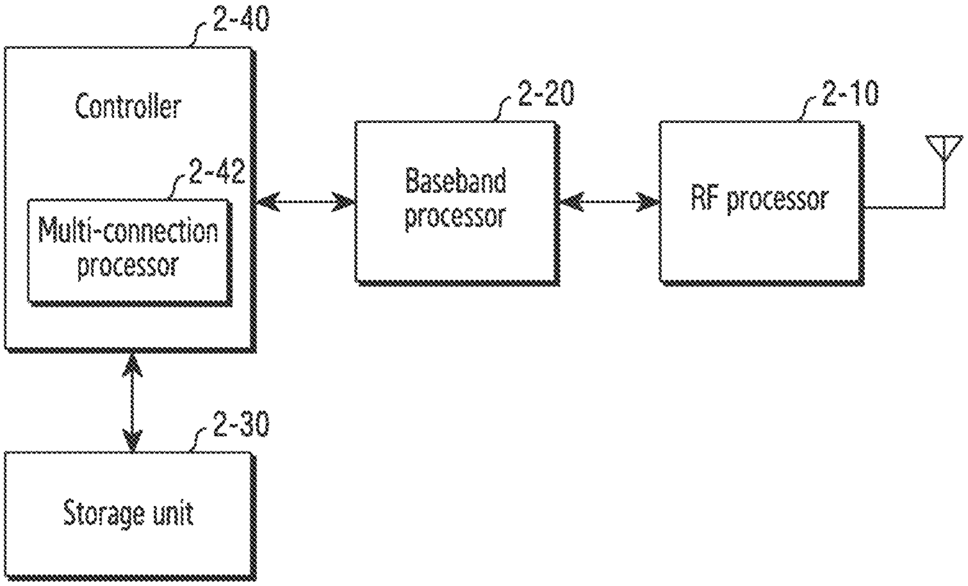
FIG. 2 is a diagram illustrating a terminal device according to an embodiment of the disclosure.

FIG. 2 is a diagram illustrating a terminal device according to an embodiment of the disclosure.

Referring to FIG. 2, the terminal may include a radio frequency (RF) processor 2-10, a baseband processor 2-20, a storage unit 2-30, and a controller 2-40. The configuration of the terminal is not limited to the configuration illustrated in FIG. 2, and the terminal may include more or fewer elements, compared to the elements illustrated in FIG. 2.

The RF processor 2-10 may perform a function, such as signal band change, amplification, etc., for transmitting or receiving a signal through a wireless channel. For example, the RF processor 2-10 may upconvert a baseband signal provided from the baseband processor 2-20, into an RF band signal, and then transmit the RF band signal through an antenna, and may downconvert an RF band signal received through an antenna, into a baseband signal. For another example, the RF processor 2-10 may include a transmission filter, a reception filter, an amplifier, a mixer, an oscillator, a digital-to-analog converter (DAC), an analog-to-digital converter (ADC), and the like, but is not limited to the example. In FIG. 2, only one antenna is illustrated, but the terminal may include a plurality of antennas. Furthermore, the RF processor 2-10 may include a plurality of RF chains. Furthermore, the RF processor 2-10 may perform beamforming. To perform beamforming, the RF processor 2-10 may adjust the phase and size of each of signals transmitted or received through a plurality of antennas or antenna elements. The RF processor 2-10 may perform MIMO, and may receive several layers when a MIMO operation is performed. The RF processor 2-10 may properly configure multiple antennas or antenna elements according to a control of the controller to perform reception beam sweeping or adjust the direction and the beam width of a reception beam so that the reception beam cooperates with a transmission beam.

According to an embodiment, the baseband processor 2-20 may perform a function of conversion between a baseband signal and a bitstream according to a physical layer specification of a system. For example, at the time of data transmission, the baseband processor 2-20 may generate complex symbols by encoding and modulating a transmission bitstream. At the time of data reception, the baseband processor 2-20 reconstructs a reception bit stream by demodulating and decoding a baseband signal provided from the RF processor 2-10. For example, in a case where an orthogonal frequency division multiplexing (OFDM) scheme is applied, at the time of data transmission, the baseband processor 2-20 may generate complex symbols by encoding and modulating a transmission bitstream, map the generated complex symbols to subcarriers, and then configure OFDM symbols through inverse fast Fourier transform (IFFT) calculation and cyclic prefix (CP) insertion. In addition, at the time of data reception, the baseband processor 2-20 may divide a baseband signal provided from the RF processor 2-10, by the units of OFDM symbols, reconstruct signals mapped to subcarriers, through a fast Fourier transform (FFT) operation, and then reconstruct a reception bit stream through demodulation and decoding.

According to another embodiment, the baseband processor 2-20 and the RF processor 2-10 may transmit and receive a signal as described above. Accordingly, the baseband processor 2-20 and the RF processor 2-10 may be called a transmitter, a receiver, a transceiver, or a communication unit. Furthermore, at least one of the baseband processor 2-20 and the RF processor 2-10 may include a plurality of communication modules to support a plurality of different wireless access technologies. In addition, at least one of the baseband processor 2-20 and the RF processor 2-10 may include different communication modules to process signals in different frequency bands. For example, the different wireless access technologies may include wireless local area network (LAN) (e.g., IEEE 802.11), cellular network (e.g., LTE), etc. Furthermore, the different frequency bands may include a super high frequency (SHF) (e.g., 2.NRHz, NRhz) band, a millimeter (mm) wave (e.g., 60 GHz) band, etc. The terminal may transmit or receive a signal to or from a gNB by using the baseband processor 2-20 and the RF processor 2-10, and the signal may include control information and data.

According to still another embodiment, the storage unit 2-30 may store data such as a basic program, an application program, and configuration information for an operation of the terminal. For example, the storage unit 2-30 may store data information, such as a basic program, an application program, and configuration information for an operation of the terminal. The storage unit 2-30 may provide stored data according to a request of the controller 2-40. The storage unit 2-30 may be configured by a storage medium such as a read only memory (ROM), a random access memory (RAM), a hard disk, a compact disc (CD)-ROM, and a digital versatile disc (DVD), or a combination of storage mediums. In addition, the storage unit 2-30 may be configured by a plurality of memories. According to an embodiment of the disclosure, the storage unit 2-30 may store a program for performing terminal location estimation according to the disclosure.

The controller 2-40 may control overall operations of the terminal. For example, the controller 2-40 may transmit or receive a signal via the baseband processor 2-20 and the RF processor 2-10.

In addition, the controller 2-40 may record and read data in and from the storage unit 2-30. To this end, the controller 2-40 may include at least one processor. For example, the controller 2-40 may include a communication processor (CP) performing control for communication, and an application processor (AP) controlling a higher layer, such as an application program. In addition, according to an embodiment of the disclosure, the controller 2-40 may include a multi-connection processor 2-42 configured to process a process operated in a multi-connection mode. In addition, at least one element in the terminal may be implemented as a single chip.

Figure 3:
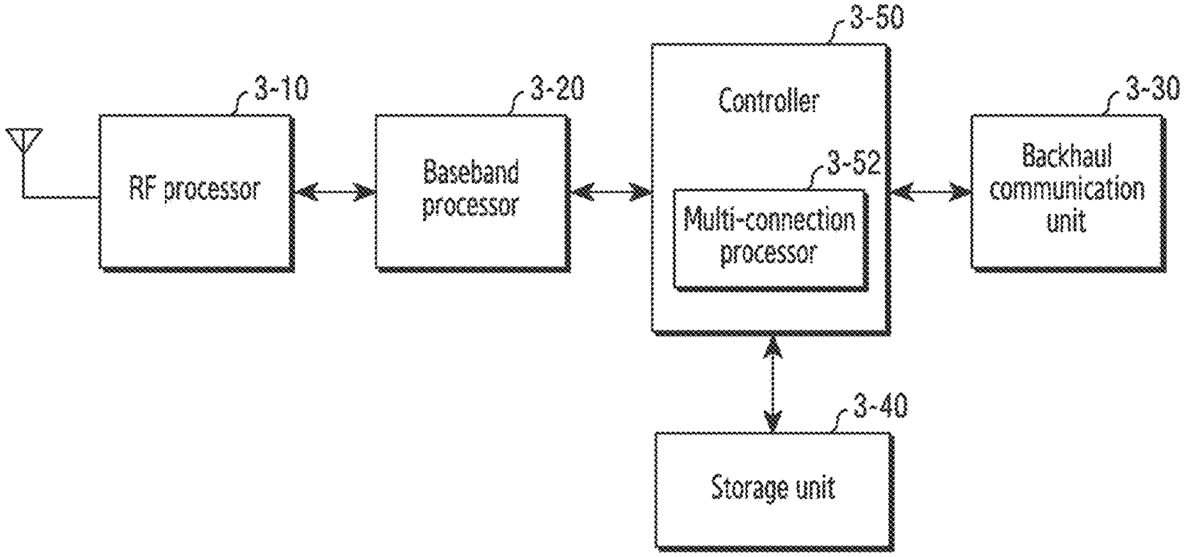
FIG. 3 is a diagram illustrating a base station device according to an embodiment of the disclosure.

FIG. 3 is a diagram illustrating a base station device according to an embodiment of the disclosure.

The base station of FIG. 3 may be included in the network described above. In addition, according to an embodiment of the disclosure, a network entity (or network function) may have the same or similar configuration as the base station of FIG. 3. For example, an LMF entity may have the same or similar configuration as the base station of FIG. 3.

Referring to FIG. 3, the base station may include an RF processor 3-10, a baseband processor 3-20, a backhaul communication unit 3-30, a storage unit 3-40, and a controller 3-50. The configuration of the base station is not limited to the configuration illustrated in FIG. 3, and the base station may include more or fewer elements, compared to the elements illustrated in FIG. 3. The RF processor 3-10 may perform a function, such as signal band change, amplification, etc., for transmitting or receiving a signal through a wireless channel. For example, the RF processor 3-10 may upconvert a baseband signal provided from the baseband processor 3-20, into an RF band signal, and then transmit the RF band signal through an antenna, and may downconvert an RF band signal received through the antenna, into a baseband signal. In another example, the RF processor 3-10 may include a transmission filter, a reception filter, an amplifier, a mixer, an oscillator, a DAC, an ADC, and the like. In FIG. 3, only one antenna is illustrated, but the RF processor 3-10 may include a plurality of antennas. Furthermore, the RF processor 3-10 may include a plurality of RF chains. The RF processor 3-10 may perform beamforming. To perform the beamforming, the RF processor 3-10 may adjust the phase and size of each of signals transmitted or received via multiple antennas or antenna elements. The RF processor 3-10 may perform a downlink MIMO operation by transmitting one or more layers.

According to an embodiment of the disclosure, the baseband processor 3-20 may perform a function of conversion between a baseband signal and a bitstream according to a physical layer specification. For example, at the time of data transmission, the baseband processor 3-20 may generate complex symbols by encoding and modulating a transmission bitstream. In addition, at the time of data reception, the baseband processor 3-20 reconstructs a reception bit stream by demodulating and decoding a baseband signal provided from the RF processor 3-10. In an example, in a case where an OFDM scheme is applied, at the time of data transmission, the baseband processor 3-20 may generate complex symbols by encoding and modulating a transmission bitstream, map the generated complex symbols to subcarriers, and then configure OFDM symbols through IFFT calculation and CP insertion. In addition, at the time of data reception, the baseband processor 3-20 may divide a baseband signal provided from the RF processor 3-10, by the units of OFDM symbols, reconstruct signals mapped to subcarriers, through an FFT operation, and then reconstruct a reception bit stream through demodulation and decoding. The baseband processor 3-20 and the RF processor 3-10 may transmit and receive a signal as described above. Accordingly, the baseband processor 3-20 and the RF processor 3-10 may be called a transmitter, a receiver, a transceiver, a communication unit, or a wireless communication unit. The base station may transmit or receive a signal to or from a terminal by using the baseband processor 3-20 and the RF processor 3-10, and the signal may include control information and data.

According to another embodiment of the disclosure, the backhaul communication unit 3-30 may provide an interface for performing communication with other nodes within a network. For example, the backhaul communication unit 3-30 may convert, into a physical signal, a bit stream transmitted from the base station to another node, for example, an auxiliary base station, a core network, etc., and may convert a physical signal received from another node, into a bit stream.

According to still another embodiment of the disclosure, the storage unit 3-40 may store data such as a basic program, an application program, and configuration information for an operation of the base station. For example, the storage unit 3-40 may store information on a bearer assigned to a connected terminal, a measurement result reported from a connected terminal, etc. In addition, the storage unit 3-40 may store information serving as a determination criterion of whether to provide or stop providing multi-connection to a terminal. The storage unit 3-40 may provide stored data according to a request of the controller 3-50. The storage unit 3-40 may be configured by a storage medium such as a ROM, a RAM, a hard disk, a CD-ROM, and a DVD, or a combination of storage mediums. In addition, the storage unit 3-40 may be configured by a plurality of memories. The storage unit 3-40 may store a program for performing terminal location estimation according to the disclosure.

The controller 3-50 may control overall operations of a main base station. For example, the controller 3-50 may transmit or receive a signal via the baseband processor 3-20 and the RF processor 3-10, or via the backhaul communication unit 3-30. In addition, the controller 3-50 may record and read data in and from the storage unit 3-40. To this end, the controller 3-50 may include at least one processor. In addition, according to an embodiment of the disclosure, the controller 3-50 may include a multi-connection processor 3-52 configured to process a process operated in a multi-connection mode.

A location estimation method of a terminal includes receiving a terminal capability request message relating to location estimation of the terminal, transmitting a terminal capability information message in response to the terminal capability request message, receiving a location estimation request message indicating a location measurement method, based on the terminal capability information message, performing the location measurement method, based on the location estimation request message, and transmitting a message including a location estimation result obtained by the performing of the location measurement method, wherein the terminal capability information message includes information indicating whether the terminal is able to aggregate PRS resources transmitted through different frequency layers.

According to an embodiment, a location estimation method of a location management function (LMF) entity includes transmitting a terminal capability request message relating to location estimation to a terminal, receiving a terminal capability information message from the terminal, transmitting a location estimation request message indicating a location measurement method, based on the terminal capability information message, and receiving a location estimation result from the terminal, wherein the terminal capability information message includes information indicating whether the terminal is able to aggregate PRS resources transmitted through different frequency layers.

Methods disclosed in the claims and/or methods according to the embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

These programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form memory in which the program is stored. In addition, a plurality of such memories may be included in the electronic device.

The programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Furthermore, a separate storage device on the communication network may access a portable electronic device.

In the disclosure, the term "computer program product" or "computer readable medium" is used to generally refer to a medium such as memory, a hard disk installed in a hard disk drive, or a signal. The "computer program product" or "computer readable medium" is an element that is provided to a method for reporting UE capability in a wireless communication system according to the disclosure.

The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium. As an example, the "non-transitory storage medium" may include a buffer in which data is temporarily stored Methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least a part of the computer program product (e.g., a downloadable app) may be temporarily generated or at least temporarily stored in the machine-readable storage medium, such as memory of the manufacturer's server, a server of the application store, or a relay server.

In the above-described detailed embodiments of the disclosure, an element included in the disclosure is expressed in the singular or the plural according to presented detailed embodiments. The singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of embodiments of the disclosure and help understanding of embodiments of the disclosure, and are not intended to limit the scope of embodiments of the disclosure. That is, it will be apparent to those skilled in the art that other variants based on the technical idea of the disclosure may be implemented. Furthermore, the above respective embodiments may be employed in combination, as necessary. For example, one embodiment of the disclosure may be partially combined with any other embodiment to operate a base station and a terminal. In addition, the embodiments of the disclosure may be applied to other communication systems and other variants based on the technical idea of the embodiments may also be implemented. For example, the embodiments may be applied to LTE, 5G, NR, or 6G systems.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device (i.e., a user equipment) individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

receiving, from a location management function (LMF) entity, a request capabilities message; and transmitting, to the LMF entity, a provide capabilities message including capability information per band, wherein the capability information includes information on maximum aggregated downlink positioning reference signal (DL-PRS) bandwidth (BW) and information on maximum number of aggregated DL-PRS resources in a slot.

2. The method of claim 1, further comprising:

receiving, from the LMF entity, a provide assistance data message including information on a plurality of DL-PRS resource set indexes for bandwidth aggregation.

3. The method of claim 1, further comprising:

receiving, from the LMF entity, a request location information message including first information indicating that the UE is requested to perform a joint measurement and second information indicating a plurality of positioning frequency layers (PFLs) for the joint measurement.

4. The method of claim 3, further comprising:

transmitting, to the LMF entity, a provide location information message including a result of the joint measurement, wherein the provide location information message includes third information indicating whether the result is based on the joint measurement and fourth information on DL-PRS resource set indexes used for the joint measurement.

5. The method of claim 4, wherein the fourth information includes fifth information on DL-PRS resource indexes used for the joint measurement.

6. A method performed by a location management function (LMF) entity in a wireless communication system, the method comprising:

transmitting, to a user equipment (UE), a request capabilities message; and receiving, from the UE, a provide capabilities message including capability information per band, wherein the capability information includes information on maximum aggregated downlink positioning reference signal (DL-PRS) bandwidth (BW) and information on maximum number of aggregated DL-PRS resources in a slot.

7. The method of claim 6, further comprising:

transmitting, to the UE, a provide assistance data message including information on a plurality of DL-PRS resource set indexes for bandwidth aggregation.

8. The method of claim 6, further comprising:

transmitting, to the UE, a request location information message including first information indicating that the UE is requested to perform a joint measurement and second information indicating a plurality of positioning frequency layers (PFLs) for the joint measurement.

9. The method of claim 8, further comprising:

receiving, from the UE, a provide location information message including a result of the joint measurement, wherein the provide location information message includes third information indicating whether the result is based on the joint measurement and fourth information on DL-PRS resource set indexes used for the joint measurement.

10. The method of claim 9, wherein the fourth information includes fifth information on DL-PRS resource indexes used for the joint measurement.

11. A user equipment (UE) in a wireless communication system, the UE comprising:

a transceiver; and a controller coupled with the transceiver and configured to:

receive, from a location management function (LMF) entity, a request capabilities message, and transmit, to the LMF entity, a provide capabilities message including capability information per band, wherein the capability information includes information on maximum aggregated downlink-positioning reference signal (DL-PRS) bandwidth (BW) and information on maximum number of aggregated DL-PRS resources in a slot.

12. The UE of claim 11, wherein the controller is further configured to:

receive, from the LMF entity, a provide assistance data message including information on a plurality of DL-PRS resource set indexes for bandwidth aggregation.

13. The UE of claim 11, wherein the controller is further configured to:

receive, from the LMF entity, a request location information message including first information indicating that the UE is requested to perform a joint measurement and second information indicating a plurality of positioning frequency layers (PFLs) for the joint measurement.

14. The UE of claim 13, wherein the controller is further configured to:

transmit, to the LMF entity, a provide location information message including a result of the joint measurement, and wherein the provide location information message includes third information indicating whether the result is based on the joint measurement and fourth information on DL-PRS resource set indexes used for the joint measurement.

15. The UE of claim 14, wherein the fourth information includes fifth information on DL-PRS resource indexes used for the joint measurement.

16. A location management function (LMF) entity in a wireless communication system, the LMF entity comprising:

a transceiver; and a controller coupled with the transceiver and configured to:

transmit, to a user equipment (UE), a request capabilities message, and receive, from the UE, a provide capabilities message including capability information per band, wherein the capability information includes information on maximum aggregated downlink positioning reference signal (DL-PRS) bandwidth (BW) and information on maximum number of aggregated DL-PRS resources in a slot.

17. The LMF entity of claim 16, wherein the controller is further configured to:

transmit, to the UE, a provide assistance data message including information on a plurality of DL-PRS resource set indexes for bandwidth aggregation.

18. The LMF entity of claim 16, wherein the controller is further configured to:

transmit, to the UE, a request location information message including first information indicating that the UE is requested to perform a joint measurement and second information indicating a plurality of positioning frequency layers (PFLs) for the joint measurement.

19. The LMF entity of claim 18, wherein the controller is further configured to:

receive, from the UE, a provide location information message including a result of the joint measurement, wherein the provide location information message includes third information indicating whether the result is based on the joint measurement and fourth information on DL-PRS resource set indexes used for the joint measurement.

20. The LMF entity of claim 19, wherein the fourth information includes fifth information on DL-PRS resource indexes used for the joint measurement.

* * * * *